United States Patent [19]
Cadotte, Jr. et al.

[11] Patent Number: 6,091,355
[45] Date of Patent: Jul. 18, 2000

[54] DOPPLER RADAR SPEED MEASURING UNIT

[75] Inventors: Roland Cadotte, Jr., Freehold; Thomas E. Koscica, Clark, both of N.J.

[73] Assignee: Speed Products, Inc., Freehold, N.J.

[21] Appl. No.: 09/120,013

[22] Filed: Jul. 21, 1998

[51] Int. Cl.[7] .................................................. G01S 13/53
[52] U.S. Cl. .......................................... 342/104; 342/175
[58] Field of Search ..................................... 342/104, 175, 342/114, 115, 117; 343/700 MS; 455/73, 81, 575, 90

[56] References Cited

U.S. PATENT DOCUMENTS

| | | | |
|---|---|---|---|
| 2,626,986 | 1/1953 | MacNichol, Jr. et al. | 324/178 |
| 2,641,458 | 6/1953 | Gilvarry et al. | 368/107 |
| 2,647,032 | 7/1953 | Holiday et al. | 346/33 A |
| 3,567,951 | 3/1971 | Montgomery, Jr. et al. | 377/53 |
| 3,907,429 | 9/1975 | Kuhn et al. | 356/28 |
| 4,028,699 | 6/1977 | Stevens | 342/108 |
| 4,128,761 | 12/1978 | Oehler | 250/222.1 |
| 4,150,825 | 4/1979 | Wilson | 473/152 |
| 4,160,942 | 7/1979 | Lynch et al. | 359/443 |
| 4,180,726 | 12/1979 | DeCrescent | 250/222.1 |
| 4,405,925 | 9/1983 | Lindner et al. | 342/28 |
| 4,515,365 | 5/1985 | Horikoshi et al. | 473/453 |
| 4,545,576 | 10/1985 | Harris | 473/468 |
| 4,563,005 | 1/1986 | Hand et al. | 473/455 |
| 4,577,863 | 3/1986 | Ito et al. | 473/453 |
| 4,583,733 | 4/1986 | Ito et al. | 473/453 |
| 4,592,001 | 5/1986 | Willard | 702/149 |
| 4,731,611 | 3/1988 | Muller et al. | 342/28 |
| 4,736,454 | 4/1988 | Hirsch | 455/129 |
| 4,770,527 | 9/1988 | Park | 356/8 |
| 4,908,615 | 3/1990 | Bayraktaroglu | 340/917 |
| 4,931,799 | 6/1990 | Wen et al. | 342/110 |
| 4,967,201 | 10/1990 | Rich | 342/175 |
| 5,059,927 | 10/1991 | Cohen | 331/77 |
| 5,069,450 | 12/1991 | Pyle | 473/415 |
| 5,262,783 | 11/1993 | Pott et al. | 342/28 |
| 5,333,855 | 8/1994 | Silin et al. | 473/455 |
| 5,365,427 | 11/1994 | Soignet et al. | 473/448 |
| 5,393,974 | 2/1995 | Jee | 250/222.1 |

(List continued on next page.)

FOREIGN PATENT DOCUMENTS

| | | | |
|---|---|---|---|
| 0129251A | 12/1984 | European Pat. Off. | G01S 7/02 |
| 0371346A2 | 6/1990 | European Pat. Off. | G01S 13/60 |
| 0479696A1 | 4/1992 | European Pat. Off. | G01S 7/03 |
| 2152663 | 8/1985 | United Kingdom . | |
| WO 94/02219 | 2/1994 | WIPO . | |

OTHER PUBLICATIONS

Article Product Brochure of Alpha Industries, Inc., for Model # DRO–3000 "X–Band Microwave Transceiver", May, 1996.

*Primary Examiner*—John B. Sotomayor
*Attorney, Agent, or Firm*—Watov & Kipnes, P.C.; Kenneth Watov

[57] ABSTRACT

A Doppler radar speed measuring module, that is self-contained and handheld, is fabricated on a multilayer PCB (printed circuit board) containing at least one antenna array and electronic circuitry. In one embodiment the antenna array is located on a top side and electronic circuitry is located on a bottom side opposite the antenna, with a ground plane layer sandwiched between the antenna array and the circuitry. The electronic circuitry includes a dielectric resonator stabilized oscillator, a microwave amplifier, a microwave mixer, a microwave coupler, voltage regulators, mechanical switches, and a display to indicate the measured speed of a moving target. The oscillator generates a very stable microwave signal which is split with part of the signal fed to a mixer and part fed to a transmit antenna. In one embodiment plated through vias electrically connect the two sides together. A transmitted signal reflects off of a moving target and is received by a receive antenna. The receive signal is electrically conducted from the receive antenna to the opposite side by plated through vias and is mixed with the oscillator signal to produce a low frequency Doppler beat signal. The Doppler signal is amplified, filtered and digitized by the A/D. A microcontroller is programmed to determine the moving target speed from the Doppler signal frequency, and drive a display to show the result.

23 Claims, 20 Drawing Sheets

U.S. PATENT DOCUMENTS

| | | | |
|---|---|---|---|
| 5,401,016 | 3/1995 | Heglund et al. | 473/431 |
| 5,418,359 | 5/1995 | Juds et al. | 250/221 |
| 5,419,549 | 5/1995 | Galloway et al. | 473/431 |
| 5,423,080 | 6/1995 | Perret et al. | 455/90 |
| 5,432,482 | 7/1995 | Bailey | 331/56 |
| 5,479,008 | 12/1995 | Nishiyama et al. | 250/222.1 |
| 5,497,163 | 3/1996 | Lohninger et al. | 342/175 |
| 5,563,617 | 10/1996 | Redfern et al. | 343/767 |
| 5,818,381 | 10/1998 | Williams | 342/24 |

DOPPLER RADAR SPEED MEASURING UNIT

RELATED DISCLOSURE DOCUMENT

A related Disclosure Document No. 412445, entitled "SPEED SENSOR, ROLAND CADOTTE, was filed on Jan. 27, 1997.

FIELD OF THE INVENTION

This invention relates to speed radar guns and motion sensors using Doppler frequency shift.

BACKGROUND OF THE INVENTION

Microwave Doppler radar systems are systems in which a stable microwave signal is generated by a microwave source and transmitted from an antenna into the field of a moving target. A reflection signal is generated from the moving target in the system's field of view. The reflected signal is received by the receiving antenna of the system, and is mixed against the signal being broadcast resulting in a difference frequency component, which is known in the art as the Doppler Frequency Shift. The difference frequency is proportional to the relative speed between the target and the radar system along the line of sight. In general, accuracy of the speed measurement depends on the short term drift of the microwave source frequency over the duration of the time of flight between the transmitted signal and later mixing of the received reflected signal. Accuracy of the measurement also depends on the ability of the processing circuitry to convert the received Doppler signal into a representative number.

Numerous radar guns are commercially available which calculate speed using the Doppler shift. Typically, these guns use a Gunn diode in a resonant housing feeding a horn antenna. The Gunn diode serves as the microwave source as well as the mixer.

Several Doppler type motion detector units have been invented which use printed circuit board technology, but all have distinct disadvantages compared to the fabrication techniques used in the present invention. Other advantages of the various embodiments of the present invention are apparent in the following discussion.

In some implementations, the antenna is outside of its housing and is connected to the associated microwave circuitry with wires. From an assembly point of view, this is a distinct disadvantage to the integrated approach used in the present invention.

Some motion detection units sense motion using a Doppler Shift Frequently, the construction of these units uses a three-layer board wherein energy is transferred from one side of the board to the other by coupling through resonant slots in the ground plane. A three-layer board is generally formed by gluing together a two-layer board to a single layer board. The use of resonant slots avoids the use of via holes, but makes control of the height from the internal ground plane to one of the outside circuitry planes difficult. The thickness of the glue has to be controlled very precisely, since microwave circuits are extremely dependent on the height of the ground plane to the top conductor.

Some low cost Doppler motion sensors are constructed on two-layer FR4 type circuit boards with two 1×2-patch antenna arrays and a ground plane on one side of the board, and the microwave circuitry and a ground plane on the other side. Putting the circuitry adjacent to the antennas has the disadvantages of increasing board size, and decreasing the RF sensitivity since longer lengths of lossy microwave transmission lines are needed to go from the circuitry to the antenna.

For the foregoing reasons, there is a need for a Doppler Radar motion measuring unit which can be constructed with low cost, has attractive DC to RF efficiency for longer battery lifetime, has minimal size, allows the ability to add RF gain stages to increase maximum range, and which uses two antennas to allow a larger amount of gain to be added than if a single antenna was used.

SUMMARY OF INVENTION

An object of this invention is to provide a speed gun that has low construction costs, and is thereby affordable for ultimate users.

Another object of the invention is to provide a compact, lightweight hand held speed gun.

Another object is to provide a speed gun that has low power consumption for long battery life.

Another object is to provide a speed gun that is highly accurate and which is sensitive enough to be used at large distances from a moving target.

A further objective of the invention is to provide a handheld speed gun design that can be integrated into a single printed circuit board and manufactured with high volume manufacturing techniques permitting the invention to be built at a relatively low cost.

Another object of the invention is to provide a speed gun for measuring the speed of a baseball or tennis ball in motion.

Another object of the invention is to provide a speed gun having a number of operational modes.

In one embodiment, the speed gun has four basic modes, an off mode, a continuous mode, a trigger mode and a memory recall mode. In the "TRIGGER" mode the fastest speed is detected and displayed three seconds after pressing the trigger button. In the "CONTINUOUS" mode the fastest speed detected every second is displayed. In the "MEMORY RECALL" mode the previous ten valid speeds, which are stored in the microcontroller are displayed.

With the problems of the prior art in mind, the various objects of the invention are provided by a unique speed gun having a configuration which uses at least one planar antenna array to both transmit and receive an RF signal, electronic circuitry including an oscillator, a microwave amplifier, a microwave coupler, a mixer, operational amplifier based Doppler Frequency amplifiers and filters, an analog to digital (A/D) converter, a microcontroller, a Liquid Crystal Display (LCD), diodes, resistors, capacitors, voltage regulators and several mechanical switches which are mounted to the same printed circuit board (PCB). In the embodiments shown and described herein, the speed of any moving object such as a baseball, tennis ball, an automobile or any object capable of creating a reflected radar signal can be measured. The present invention is constructed on a four layer board whose RF circuitry is directly behind the antennas rather than with the RF circuitry adjacent to the antenna. The oscillator generates a microwave signal which is split with part being transmitted, and part being used as the local oscillator for the mixer. The transmitted signal reflects off a moving target and its frequency is shifted by the Doppler shift, which is proportional to the speed of the object. This Doppler shifted signal is received by the receive antenna and amplified by the Microwave amplifiers. This signal is inputted into the mixer and mixed with the local oscillator signal. The mixer outputs a signal whose frequency is the Doppler frequency. This signal is amplified and filtered by operational amplifier based amplifiers and filters to bring the signal level to an appropriate level for the A/D and to eliminate outside interference and to reduce the noise floor. The signal is then inputted into an A/D which digitizes the waveform. A microcontroller analyzes this waveform and determines the number of cycles within a certain time span, thereby determining the frequency from which the speed of the object can then be calculated, and either outputted to a display such as an LCD or put into memory for later use. In the embodiment shown, the speed is represented on the LCD over a range of 0 to 150 miles per hour (mph), in discrete steps of one mph.

The embodiment shown and described in detail below includes three modes of operation, which are as previously mentioned, continuous, single shot trigger, and memory recall mode. In the continuous mode, the highest measured value each second is displayed on an LCD readout. Approximately thirty-one Doppler measurements are performed each second in the continuous mode of operation. Upon start of a single shot trigger mode, a 0.2 second delay elapses to allow mechanical settling of the unit's vibration generated at the moment of the button release, and then after a brief delay, the highest Doppler measurement over the next three second period is displayed on an LCD readout, with the value remaining on an LCD readout until a new request in made. In the memory recall operating mode, each Doppler measurement that is displayed on an LCD readout is stored in a buffer for the most recent ten readings. Upon request, the unit presents the most recent ten displayed measurements for 0.8 seconds each, separated by 0.2 seconds of a blank LCD display.

In the present invention, a number of design characteristics are employed to contribute to the accuracy of measurement. Multiple measurements are taken with the highest in a period of time being selected as the measurement. As a target moves across the radar field of view or viewing area, its velocity vector crosses different angles with respect to the line between the radar unit and its target. The approach of displaying the highest measurement of several allows the measurement closest to the line of sight to be displayed as representative of the relative speed of the target. In the single shot trigger mode, the 0.2 second delay allows mechanical settling of the unit's vibration. The unit's vibration induces temporary instability in the oscillator's output which has a direct effect on the measurement error, and the 0.2 second delay eliminates errors associated with the mechanical vibration.

Normally, from unit-to-unit, the physical components used to bias the A/D input port to its midpoint vary due to normal component tolerance. The correct value of the midpoint is important for determining the optimal detection thresholds above and below this midpoint, which are used for counting alternate positive and negative half cycles of the input Doppler signal. In the present invention, upon power up of the microcontroller, a measurement is made of the actual quiescent point of the A/D input. Next, the pretrigger thresholds above and below the quiescent or mid-point are determined, which are used for arming the software for counting cycles. Next, the thresholds for counting the positive and negative half cycles of the input signal are determined. Finally, the microwave electronics is powered up and measurement of Doppler occurs dependent upon the operating mode of the unit. The present invention also addresses the elimination of errors caused by weak signals. A Doppler measurement does not begin unless the signal strength is above a certain pretrigger level. Once triggered, the Doppler counting routine uses a lower signal level trigger to give a more reliable count of weak, variable amplitude signals.

The present invention also conserves power by; driving the LCD display directly from the microcontroller, which eliminates additional components which would otherwise consume power. The microcontroller drives a charge pump circuit for the generation of the negative voltages needed, which eliminates extra components, and permits the microcontroller to power up the microwave electronics upon demand. The microcontroller can determine signal frequency using amplitudes as low as 100 mVolt, which eliminates the need for additional amplifier and amplitude limiter circuitry. Also, the microcontroller is a reduced instruction set computer (RISC) operating at an intermediate frequency of 4 Mhz. RISC microcontrollers consume less current than conventional complete instruction set computers (CISC) when operated at the same clock frequency. And the microcontroller operates at a regulator voltage under 5 volts. Power consumption is generally less as supply voltage is lowered for CMOS microcontrollers.

BRIEF DESCRIPTION OF THE DRAWINGS

The various embodiments of the invention are described in detail below, with reference to the drawings, in which like items are identified by the reference designations, wherein.

DETAILED DESCRIPTION OF THE INVENTION

Figure 1:
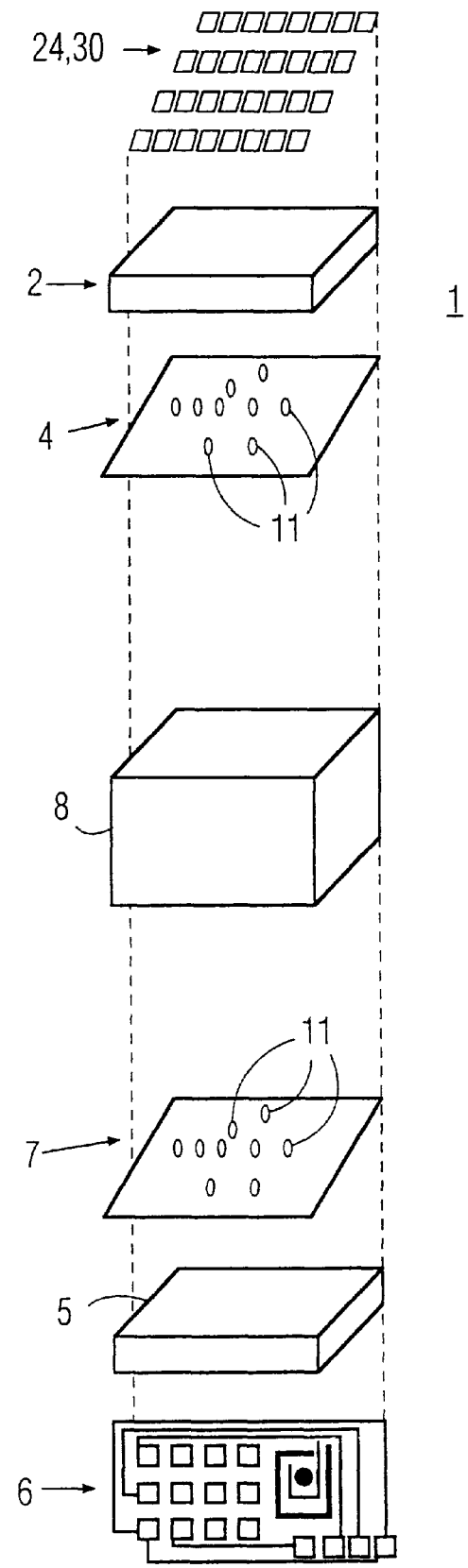
FIG. 1 is a simplified exploded assembly view of one embodiment of the invention for an RO4003 4 Layer Board, showing the transmit and receive antennas, substrates, core, ground planes, and electronic circuitry, of the various layers.
Figure 2:
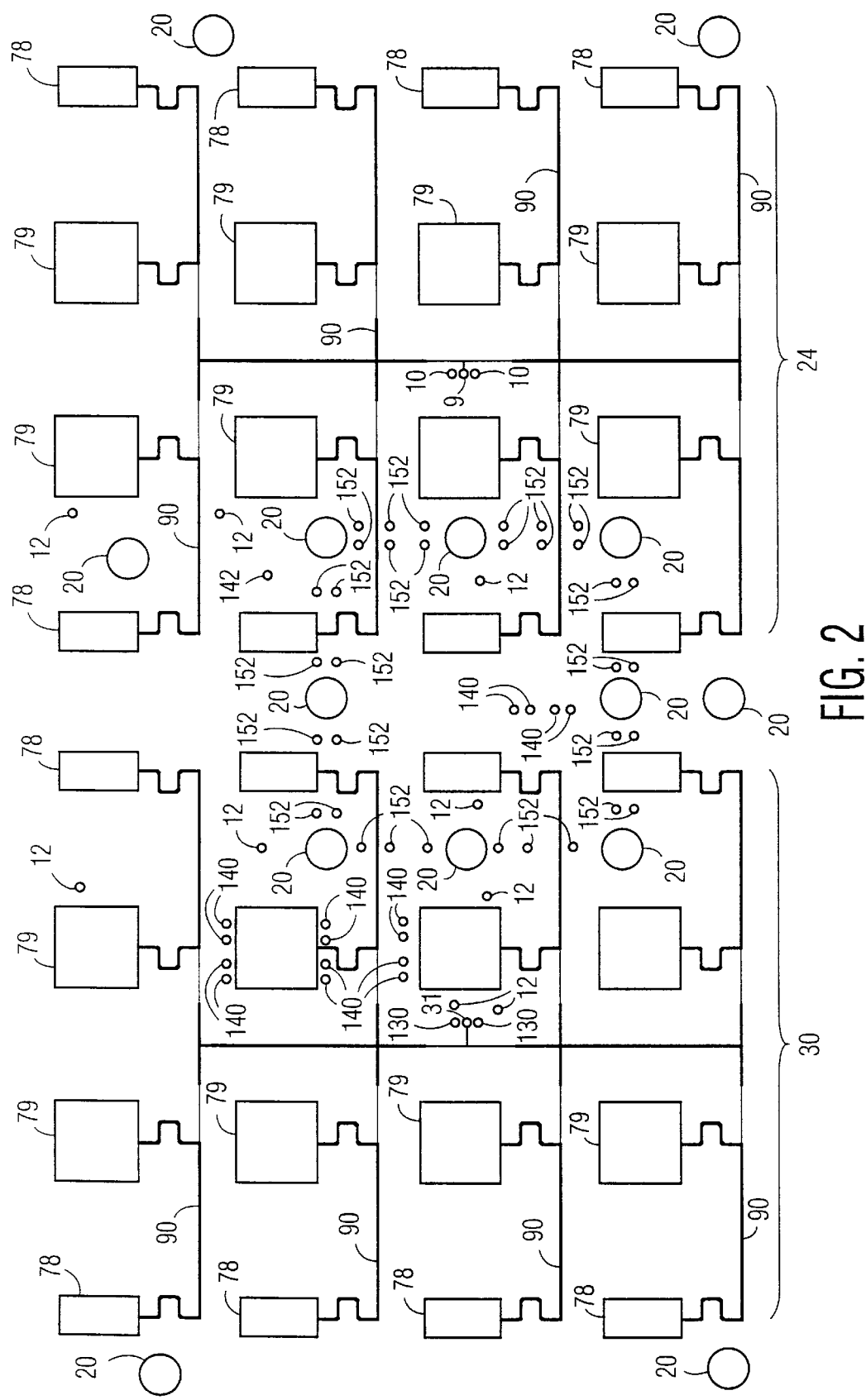
FIG. 2 is a top view of two 4×4 planar patch antenna arrays, for one embodiment of the invention.
Figure 3:
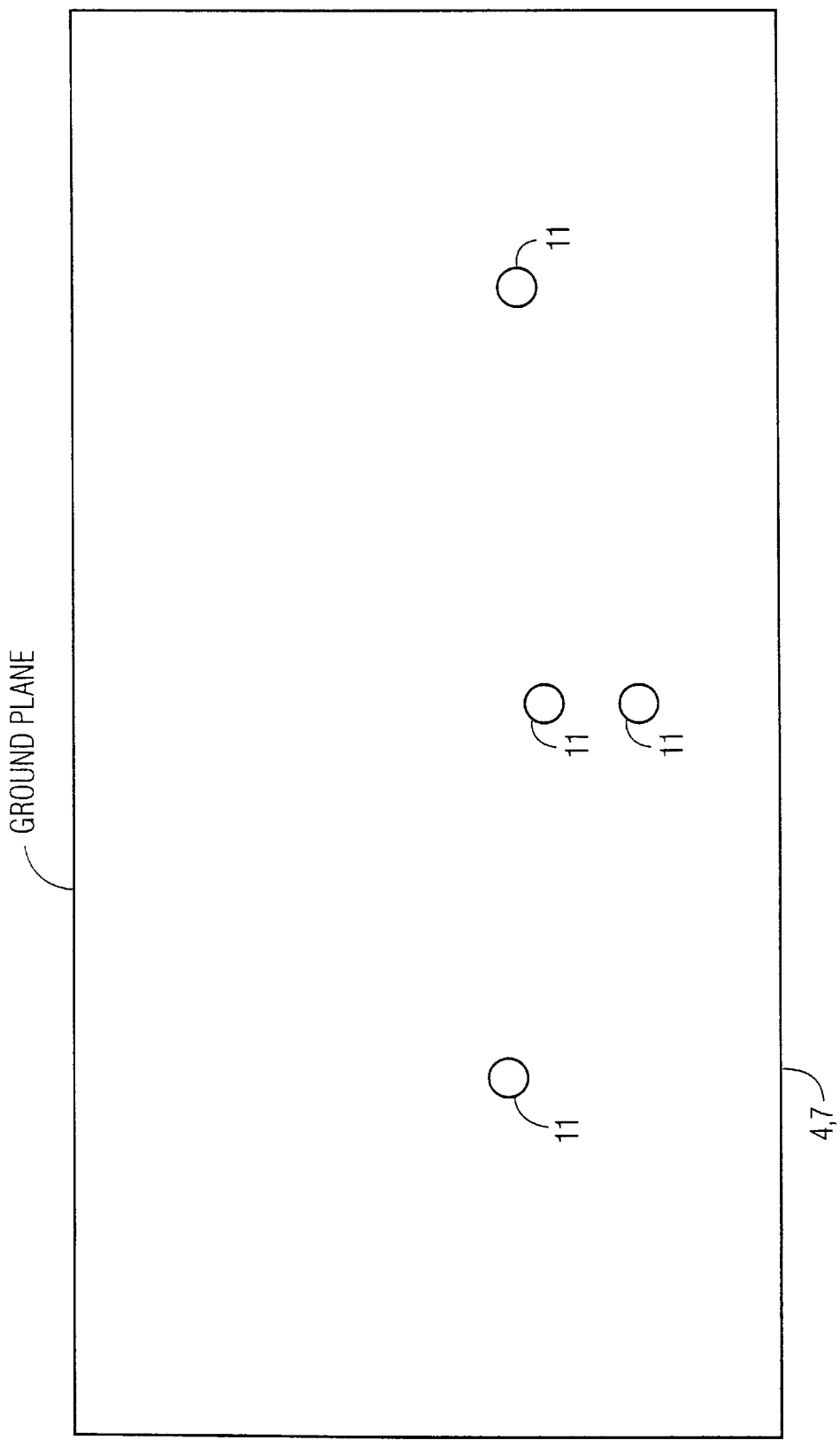
FIG. 3 is a top view of the ground plane, illustrating etched holes, for one embodiment of the invention.
Figure 4:
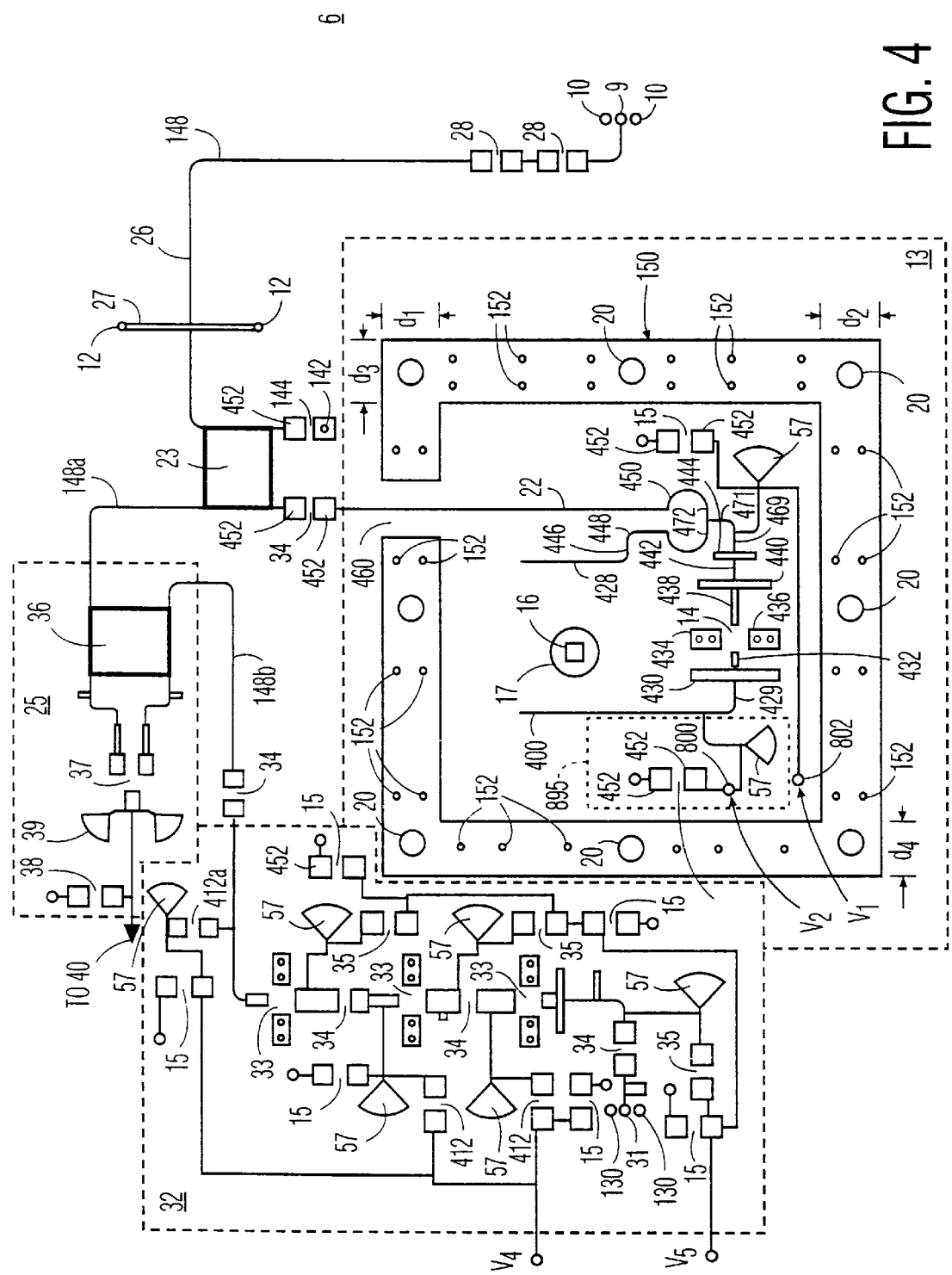
FIG. 4 is a view of the pattern for the electronic circuitry, for one embodiment of the invention.

The operation of the speed gun is based on a "DOPPLER RADAR SPEED MEASURING UNIT" which in one embodiment is constructed on a RO4003 substrate, which is a Rogers Corporation 4000 series substrate. As shown in FIG. 1, two such substrates 2 and 5 are used in this example. The substrates 2, 5 could have been provided by FR4, the common printed circuit board substrate or any other substrate, which can use PCB (Printed Circuit Board) processing techniques, or other multilayer circuit board technologies including LTCC (low temperature cofired ceramic) and HTCC (high temperature cofired ceramics). RO4003 is a fairly new substrate, which exhibits good microwave properties yet can be manufactured using standard PC board processes. RO4003 is chosen for its good microwave properties and low cost. FR4 is less expensive than RO4003 but exhibits poorer performance at microwave frequencies. The present speed gun module is built using a four-layer board 1, which means that is has four-layers (24, 30), 4, 7, 6 of copper patterns, as shown in FIG. 1. The board 1 is constructed by laminating together two Rogers 4003 eight mil thick substrates 2 and 5 each clad on opposing sides with one ounce copper, as shown. Different substrate dimensions and copper weights could have been used. In the preferred embodiment, one RO4003 substrate 2 has two 4×4 planar patch antenna arrays 24, 30 patterned in one of the copper layers, as shown in FIG. 2. The copper layer on the opposite side of this substrate 2 serves as the antennas' ground plane 4 and is mostly un-etched, as shown in FIG. 3, except for holes 11. The module could also have been designed using two non-4×4 planar patch arrays and/or using only one planar antenna, depending on the desired size, antenna beamwidth and radar sensitivity. The electronic circuitry is located on the second RO4003 substrate 5. One layer of this second substrate 5 (which is the outer layer of the "DOPPLER RADAR SPEED MEASURING UNIT") contains the pattern for the electronic circuitry 6 as shown in FIG. 4. The electronic components comprising transistors, resistors, capacitors, integrated circuits, and the like are mounted to this layer or circuit pattern 6 using surface mount technology. The reference designations for these components are shown on the pattern 6 where the component will be mounted. The second layer of this substrate 5 is mostly un-etched and serves as the ground plane 7 for the electronic circuitry and is identical to the ground plane 4 on the first substrate 2 (see FIG. 3). The two RO4003 substrates or boards 2 and 5 are laminated together opposite sides of an FR4 core 8 as shown in FIG. 1, using standard PCB processes. The two ground planes 4, 7 of substrates 2, 5, respectively, are secured to opposite sides of core 8. The holes 11 of ground planes 4 and 7 are to accommodate plated through vias (not shown). A plated through via is a hole drilled through a PC board and plated with metal to connect electrically the opposite sides 6 and 24, 30 of a PCB, such as 2 and 5, respectively. The four-layer board 1 has a core 8 of FR4 material approximately thirty-one mils thick to increase the rigidity of the overall laminated board 1 as shown in FIG. 1. Note that thirty-one mils is a standard thickness, but other thickness, can be used. An alternative to the core 8 is to use a number of prepreg layers to thicken the board. This option will be less expensive, however, the board will have less rigidity than one of equivalent thickness with an FR4 core. Other materials can be used for the core, however, FR4 is the most common.

The antennae 24, 30 and the electronic circuitry 6 are on opposite outside sides of the board 1. The antennae 24, 30 includes a plurality of pads 78 and 79 electrically connected by conductive paths 90. The antennae 24, 30 are connected to the electronic circuitry located on opposite side of the board 1 by standard plated through vias 9, 31 as shown in FIG. 2. Vias 10, 130 connected to ground are placed next to the vias 9, 31, respectively, electrically connecting the two ground planes 4 and 7 of board 1 together (see FIG. 2). Note that the vias 10, 130 extend between associated vias of substrate 2, core 8, and substrate 5. This insures a good return path for the microwave signal and minimizes any reflections as the signal propagates from one side of the board 1 to the other. Via holes 12 in FIG. 2 are grounded plated through via holes used for grounding in the circuitry located in layer 6.

As shown in FIGS. 1 and 3, the ground planes 4, 7 located in the interior of the board 1 have small circles 11 etched in the copper layers 4 and 7 to allow the plated through vias to pass through the ground plane without shorting. The etched circles shown accommodate vias 9, 30, 800, 802 though their positions are not exact and are for illustration purposes only.

There are two methods of drilling printed circuit boards. One method is to drill the individual substrates 2, 5, 8 before they are laminated together. A second method is to drill the holes after the board 1 is laminated together. The first method offers the advantage of putting holes anywhere on the board without worrying about other layers. However, this method is more costly than the second method since it requires more than one drilling step. The method in the preferred embodiment uses the second method, but via holes have to be placed such that they avoid the circuit patterns on all other layers.

The electronic circuitry on one side of the board 1 contains a microwave oscillator 13, amplifier 32, mixer 25, coupler 23, and low frequency amplifiers and filters, voltage regulators, diodes, resistors, capacitors and mechanical switches, connected to the pattern 6 as shown in FIG. 4. Note that in FIG. 4 the location of these components are indicated by inserting their reference designations on the pattern where the components are located. The oscillator 13 is the microwave circuit that generates the transmitted microwave signal. The oscillator 13 contains a high frequency transistor 14, dc bias circuitry including capacitors 15, a one-hundred mil square sixty-two mils thick piece of boron nitride 16, and a dielectric resonator 17. The boron nitride substrate 16 is glued to the RO4003 substrate 5. The dielectric resonator 17 is glued to the boron nitride substrate 16, using Gel Bond Adhesive-199. This adhesive is a type of "SUPER GLUE" manufactured especially for ceramics. More generic types of super glues will probably also work. The boron nitride substrate 16 is placed between the dielectric resonator 17 and the RO4003 substrate 5 to minimize the degradation of the dielectric resonator's loaded quality factor by the RO4003 substrate 5. A metal or metallized enclosure 18, shown in FIG. 5, covers the oscillator 13 and is used to keep the microwave oscillation extremely stable. The enclosure 18 can be either screwed or attached to the microwave board 1, that is to substrate 5, with an epoxy or glue type substance. In the one embodiment, the enclosure is screwed to the four-layer board with screws 19, shown in FIG. 5, originating from the antenna side of the board 1, protruding through clearance holes 20 (see FIG. 2) in the four-layer board 1 and screwed into threaded holes 19A in the enclosure 18. For proper shielding of the oscillator, the enclosure 18 should be grounded. The enclosure 18 is mounted to a grounded pattern 150 in the printed circuit board shown in FIG. 4. The pattern 150 is a ring containing many plated through via holes 152 to ground. Ideally the via holes 152 should be placed less than half a wavelength apart (approximately three-hundred mils), as shown in FIG. 4 to insure a good RF ground. The enclosure is grounded to the printed circuit board by making good electrical contact to this grounded ring 150. A screw 120 protruding through the metallized enclosure and directly above the dielectric resonator 17, shown in FIG. 5, can be used to tune the oscillator 13 frequency. Moving the screw 120 closer to the resonator 17 increases the frequency. Number two screws and larger have been used to tune the frequency. Larger screw diameters will give a larger tuning range and screws with a greater number of threads per inch will give finer tuning. In this embodiment, the enclosure 18 is made of aluminum because of its low cost and good machineability, but other materials can be used. The aluminum enclosure 18 has a small notch 21 in one of its walls allowing the oscillator signal to propagate from the inside of the enclosure to the outside of the enclosure by a microstrip line 22, as shown in FIG. 4.

Figure 5:
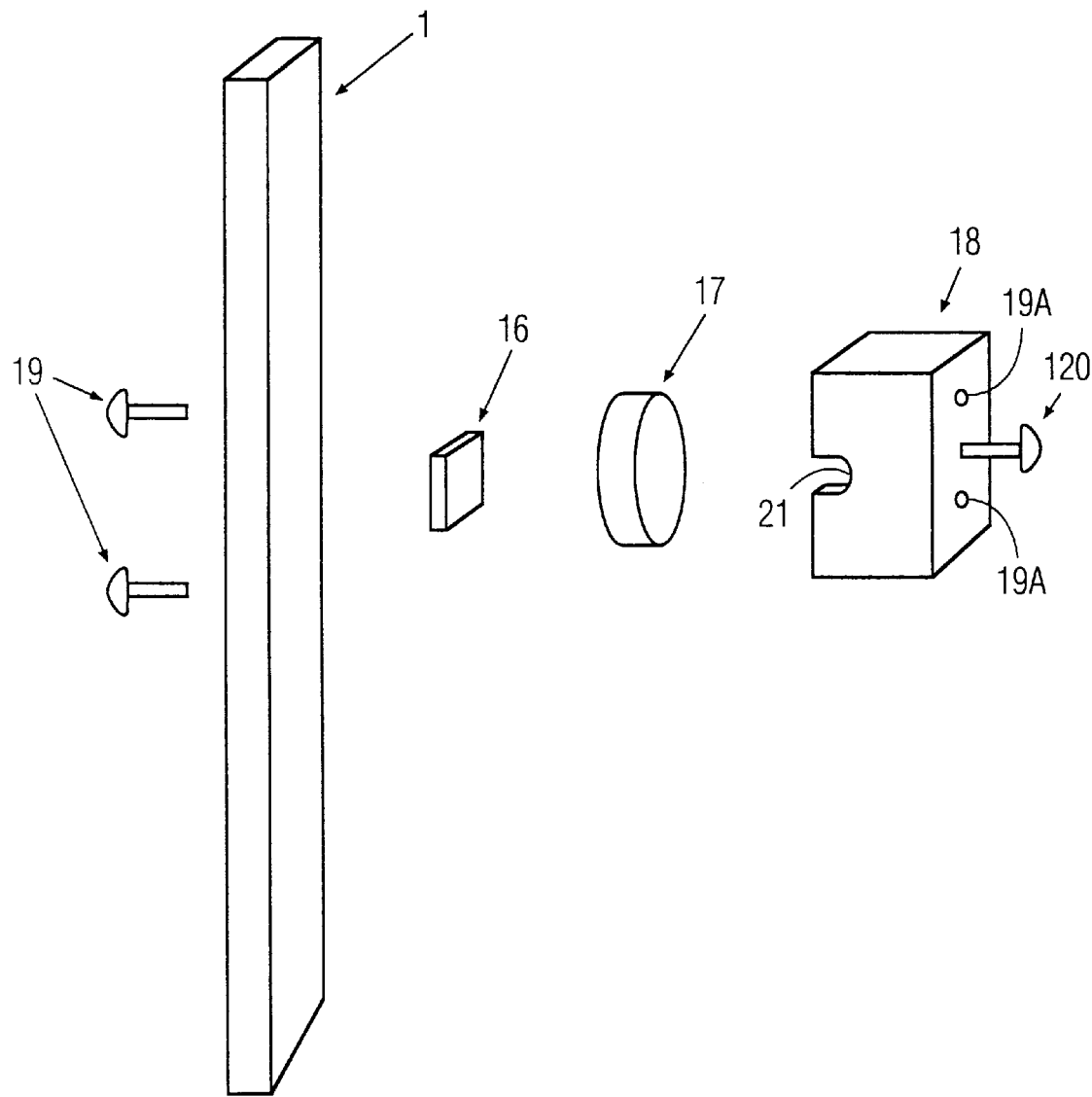
FIG. 5 is an exploded assembly view of the mounting of an aluminum enclosure on the 4 layer board, for one embodiment of the invention.
Figure 5B:
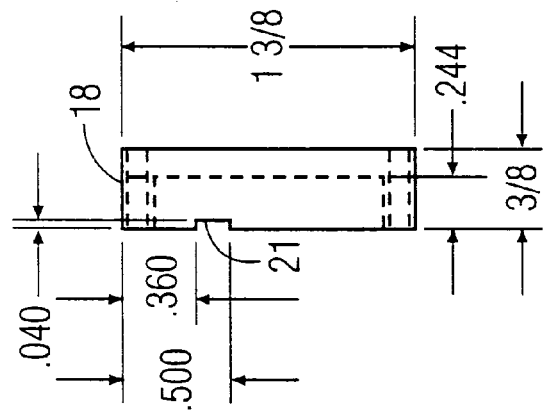
FIG. 5B is a side elevation view of the enclosure of FIG. 5A.
Figure 5A:
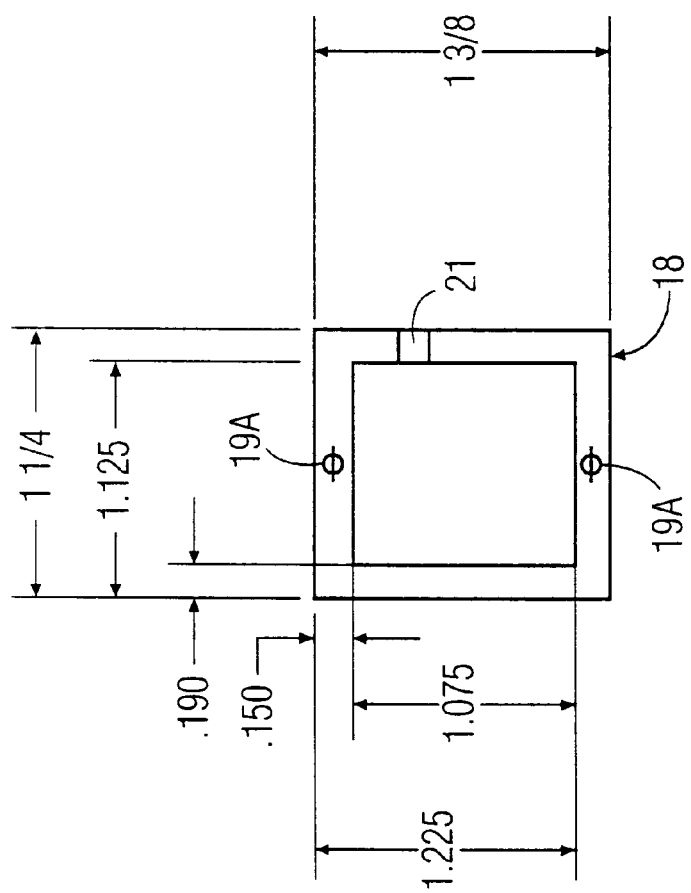
FIG. 5A is a bottom view of an enclosure for one embodiment of the invention, as shown in FIG. 5.

FIGS. 5A and 5B show the dimensions of the enclosure 18, which should be located such that the notch 21 in the enclosure 18 sits above the gap in the grounded ring 150. The inner wall of enclosure 18 containing notch 21 should line up or meet with the inner edge of ground ring 150 containing notch 460 (see FIG. 4). Note that these dimensions, which are shown in inches, are critical for proper operation of the present speed gun. Gate and drain voltages can be applied via printed circuit conductors to the FET 14 by connecting with plated through vias 800 and 802, respectively, DC bias lines located on the antennae 24, 30 layer and located directly behind the oscillator 13 to DC bias circuits 895 located inside the enclosure. For simplicity these DC bias lines are not shown in the figures.

Figure 6:
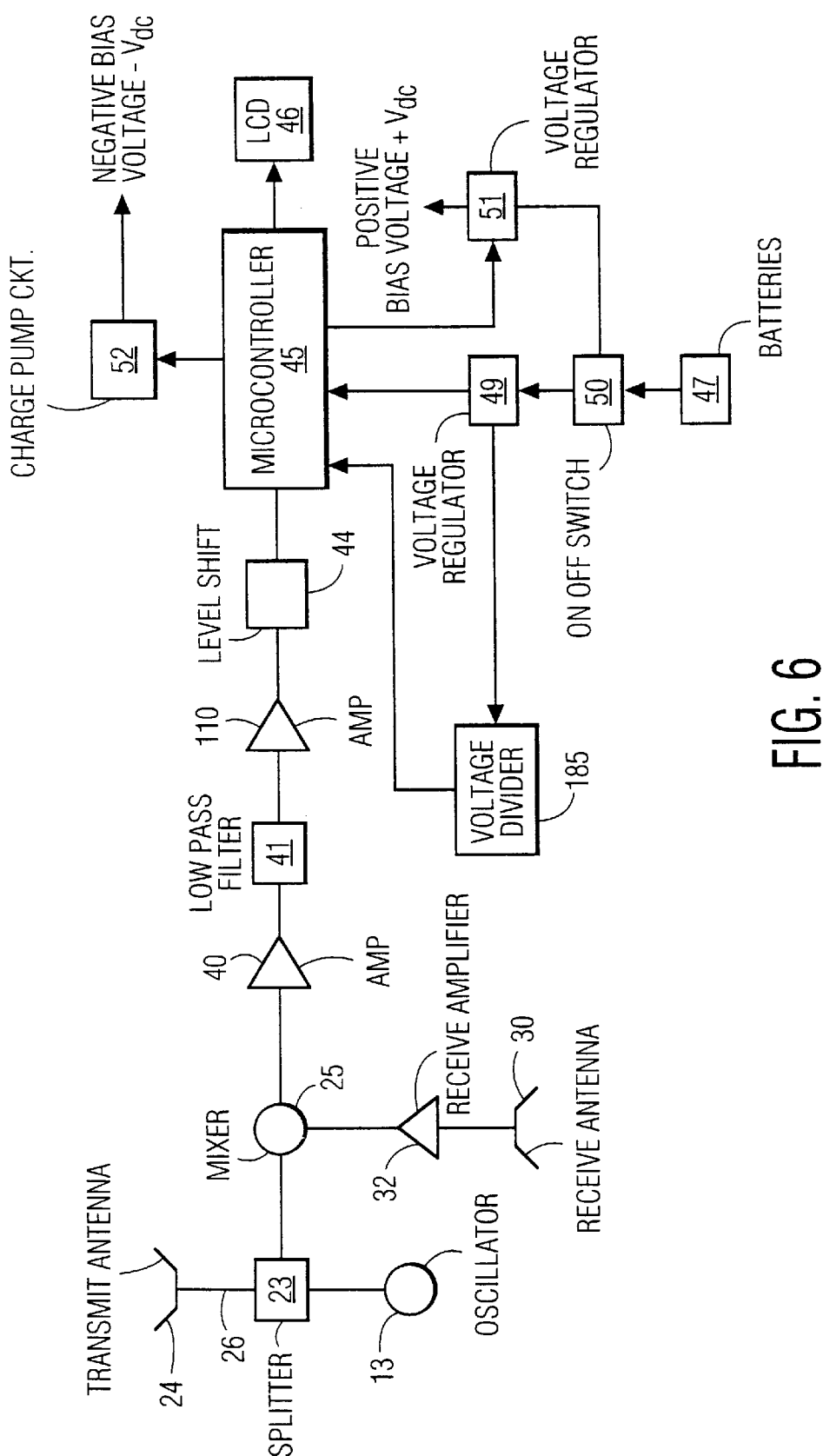
FIG. 6 is a block circuit diagram of one embodiment of the invention.

In the preferred embodiment of the present speed sensor invention, as shown in the block schematic diagram of FIG. 6, the RF signal from oscillator 13 is split by a branch line coupler 23, with one part fed to the transmit antenna 24, and the other part fed to the mixer 25. The microstrip line 26 which connects the coupler 23 to the transmit antenna 24 contains several filters (not shown in the schematic) to reduce the second harmonic generated by the oscillator 13 to an FCC allowable level. As shown by the printed circuit pattern in FIG. 4, two shorted quarter wavelength microstrip lines 27 at 10.525 GHz connected to the microstrip line filter the oscillator's second harmonic, 21.050 GHz. These shorted lines 27 are short circuits at the second harmonic frequency, but appear almost nonexistent at 10.525 GHz. Other low pass or bandpass filter types could have been used. Two lumped GRM40C0G010C050BD 1 pf capacitors 28, having the placement shown in FIG. 4, are placed before the transmit antenna 24 to filter any received signals below approximately 900 MHz and to filter, by several decibels, the oscillator's second harmonic. These capacitors 28 have low insertion loss at 10.525 Ghz. Other capacitor values or types could have been used. The signal propagates on a plated through via 9 (see FIG. 2) to the transmit antenna 24. Two plated through vias 10 to ground are placed adjacent to the plated through via 9 and serves as the signal's return path. The signal is transmitted by the 4×4 array transmit antenna 24 with approximately 18 db of gain or approximately twenty-two degrees beamwidth in azimuth and elevation. This size antenna was chosen because of the tradeoff between size and gain. To increase the gain of each antenna 24 and 30 by 3 dB, their size would have to double. This would increase the operating distance by 50%, neglecting losses in the feed network, however, the radar speed gun would become too large for a pocket sized item. The antennae 24, 30 were not made smaller because they currently offer a small enough beamwidth to be able to discriminate between moving objects. Making the antennae 24, 30 smaller would increase the beamwidth, decreasing the radar gun's ability to discriminate between objects and in addition the operating range would be decreased.

Figure 7:
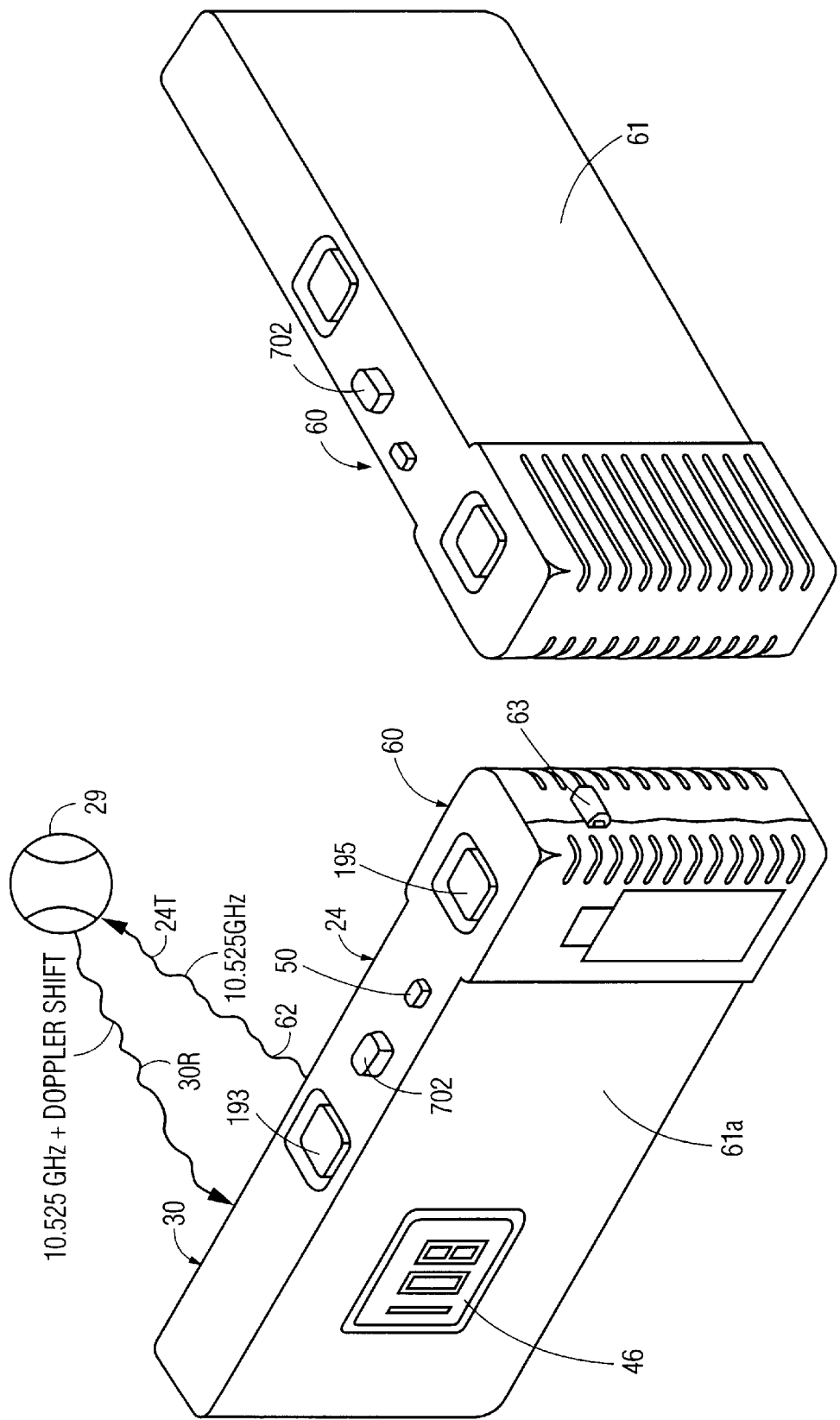
FIGS. 7A and 7B are pictorial views of the back and front, respectively, of a housing for an embodiment of the invention.

As shown in FIG. 7, the transmitted signal 24T from transmit antenna 24, reflects off the target 29 (baseball, tennis ball etc.) as reflected signal 30R received by the receive antenna 30. The receive antenna 30 is identical in the preferred embodiment to the transmit antenna 24. However, the only requirement for the antennae 24, 30 is that for optimum operation they have the same polarization. In an alternative embodiment, a single antenna is used so that the signal is transmitted and received by the same antenna. In all cases, the received signal is shifted in frequency slightly from the original transmit frequency. This shift is known as the Doppler frequency shift and is proportional to the speed of the target. The received signal 30R propagates from the receive antenna 30 along the plated through via 31 (see FIG. 2), to the electronic circuitry 6 located on the opposite side of the board 1. Plated through vias 130 to ground are adjacent to the plated through via 31 and serve as the signal's return path. The vias are in a configuration similar to that used in the transmit side for transmit antenna 24. The signal could have been coupled from the electronic circuitry 6 to the antenna 30 using resonant slots instead of the via holes. However, resonant slots are typically one-half wavelength in length and therefore require a much greater physical area. To increase the present speed gun's sensitivity the received signal is amplified by a microwave amplifier 32 to overcome the 1/f noise, as shown in FIG. 6. In the preferred embodiment, more gain can be used than in the single antenna design resulting in greater sensitivity. The preferred embodiment contains a three-stage amplifier consisting of three Mitsubishi MGF4918D transistors 33 (see FIG. 8), four GRM40C0G010C050BD 1 pf dc blocking capacitors 34 and dc bias circuitry 895 (see FIG. 10). The amplified signal is sent to the mixer 25, which produces a signal whose frequency is the difference frequency of the two input signals, i.e. the received signal 30R and the oscillator signal (one part of the oscillator signal is split and fed to the mixer 25). This difference frequency is the Doppler shift.

Figure 8:
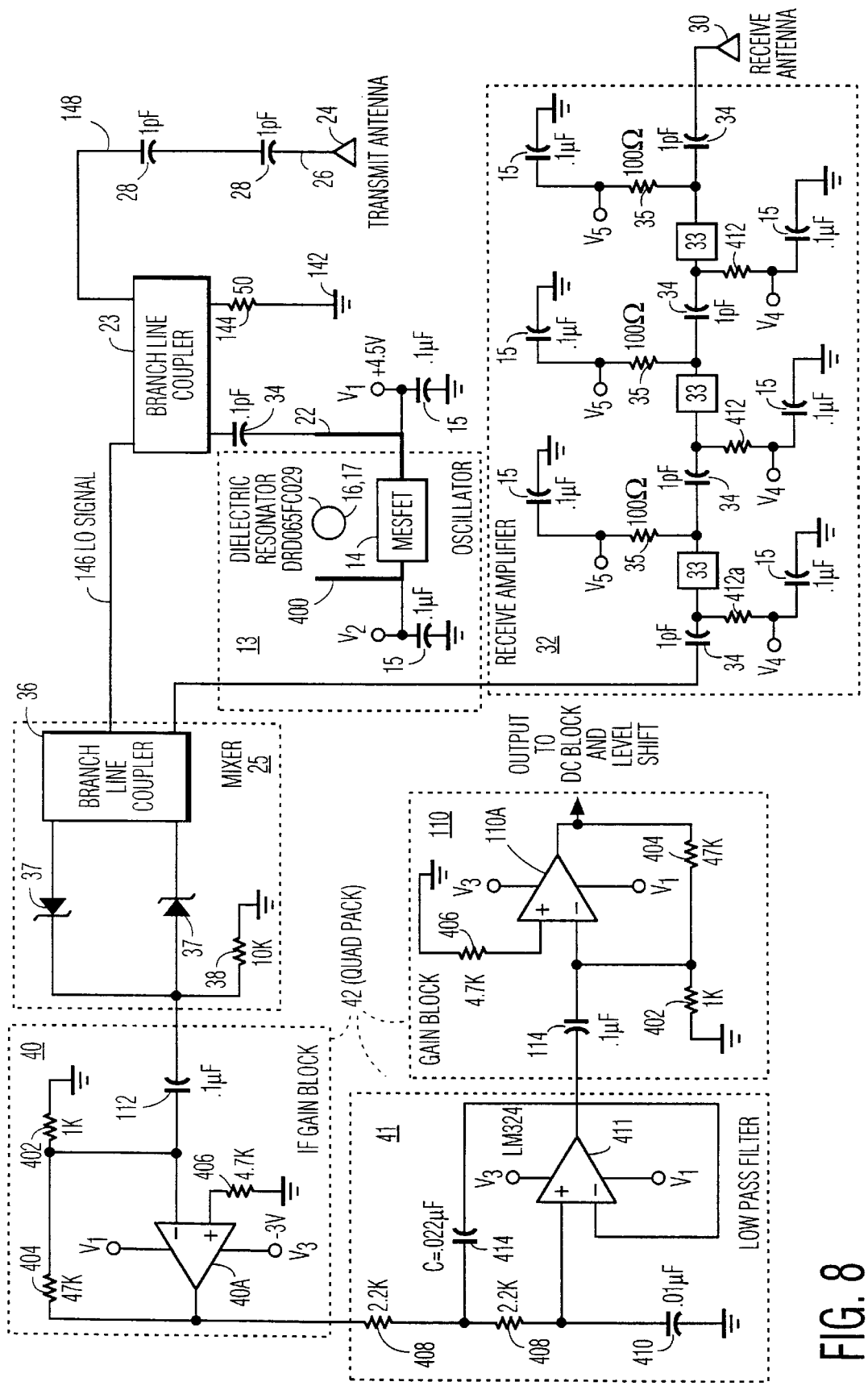
FIG. 8 is a schematic view of the RF and Analog Circuitry for an embodiment of the invention.

As shown in FIG. 8, which is a schematic view of the circuitry of the present speed gun, the mixer 25 contains a branch line coupler 36, two Schottky diodes in a series pair configuration 37 (an SMS3988 from Alpha Industries Inc.), a 10 kohm resistor 38 and a pattern 39 on the circuit board 5 (see FIG. 4) which electrically matches the diodes 37 to the branch line coupler 36 and short circuits the microwave signal at the mixer's output. The 10 kohm resistor 38 connected to the mixer's output is used as a dc return path to ground. The mixer's Doppler shifted output signal ranges from 0 Hz to approximately 4 khz for speeds from 0 mph to 128 mph for a transmit frequency equal to 10.525 Ghz, in this example.

Figure 9:
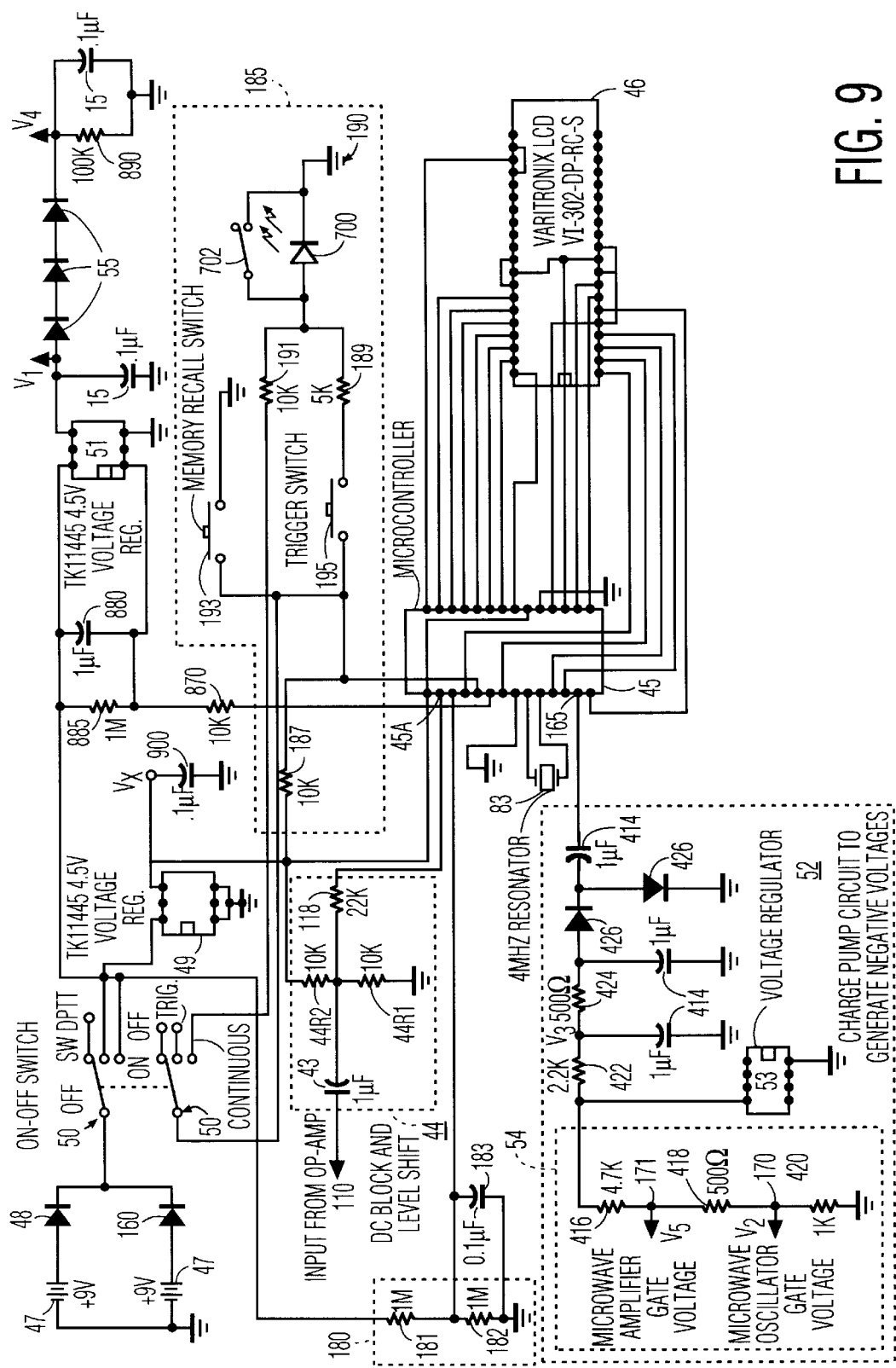
FIG. 9 shows a circuit schematic diagram including a microprocessor, LCD display, and power supply portions for an embodiment of the invention.

The Doppler signal from mixer 25 is amplified by two operational amplifier based amplifiers 40, 110 to increase the signal level to the level appropriate for the A/D (microcontroller) 45 shown in FIG. 9, through the blocking capacitor 43, which together with a dual 10 kohm resistor 44R1 and 44R2, and series resistor 118, form a level shifter 44, as shown in FIG. 6. In the preferred embodiment, the Doppler signal is amplified approximately 2500×by two operational amplifiers 40A, 110A (see FIG. 8) using standard inverting amplifier configurations 40, 110, respectively. The exact amount of gain is not critical, although to a practical limit increasing the gain, will increase the range. Increased gain will increase false triggering, and decreased gain will decrease the radar gun's operating range. The Doppler Signal is filtered by an active lowpass filter 41 interjected between amplifiers 40 and 110 to reduce the system's noise floor by reducing the system's bandwidth. The lowpass filter 41 in the embodiment shown utilizes a standard two pole topology, and has a cutoff frequency of approximately 4 KHz which corresponds to 128 mph. The amplifiers 40, 110 and the lowpass filter 41 previously described were built using a LM324 operational amplifier quad pack 42 (see FIG. 8). In the embodiment shown, amplifier 40 is used for the first stage to amplify the Doppler signal before it loses any of its signal strength. Lowpass filter 41 is located as shown between the two amplifiers 40 and 110, for filtering any high frequency interference signals that could potentially introduce errors and to lower the systems noise floor.

Highpass filtering is desirable to filter any interference signals that may be present, such as 60 Hz from power distribution systems. Also since the present radar gun is 1/f noise limited, it is desirable to filter the lower frequencies where 1/f noise is greatest. Highpass filtering can be accomplished with operational amplifier based highpass filters (active highpass filters). However, for simplicity the radar gun in the preferred embodiment uses the dc blocking series capacitors 112, 114 in the input connections of operational amplifier based amplifiers 40, 110, respectively, to provide highpass filtering. If greater attenuation is required than offered by the series capacitors 112, 114 active highpass filters can be used. Highpass filtering should not be used when there is a potential for a square wave input into the highpass filter and the algorithm for determining the Doppler shift requires a "SINEWAVE TYPE SIGNAL". A "SINEWAVE TYPE SIGNAL" is defined as a signal that is a sinewave or a clipped version of a sinewave. A square wave will be present when the Doppler signal strength is great enough to saturate either operational amplifier based amplifiers 40 and 110. A highpass filter will output a "SINEWAVE TYPE SIGNAL" with a sinewave input. However, it will output a positive impulse, followed by a constant, followed by a negative impulse when a positive square wave is inputted. This is a result of highpass filters essentially taking the derivative with respect to time of the inputted waveform. If required, highpass filtering should be placed towards the front of the amplifier chain before any amplifier saturation can occur.

The output signal from amplifier 110 is level shifted (see FIG. 9), so it swings from approximately 0 Volts dc (Vdc) to 4.5 Vdc, a level appropriate for the A/D converter input. This is accomplished by dc blocking the signal with a capacitor 43 and inputting the signal into a voltage divider 44 consisting of resistors 44R1 and 44R2. In the preferred embodiment a 1 uf capacitor 43 is used to block the DC component of the signal, and a voltage divider consisting of two 10 kohm resistors 44R1 and 44R2 is connected in series between a positive regulated supply +4.5 Vdc and ground. A 22 kohm resistor 118 is connected from the midpoint of the voltage divider 44 to the input of A/D input terminal 45a, to prevent lockup of the CMOS circuitry used in the PIC16C72 microcontroller 45. Historically CMOS circuitry inherently had lockup problems from large input signals. The 22 kohm resistor 118 is precautionary and may not be needed. The Doppler signal is digitized by the A/D internal to the PIC16C72 microcontroller 45, which then calculates the Doppler shift and the corresponding speed. The microcontroller displays the speed on an LCD 46 connected to microcontroller 45, as shown. The digitized speed signal could also have been output to other types of displays including LEDs and computer screens.

In the preferred embodiment, with further reference to FIG. 9, two 9-volt batteries 47 connected in parallel power the present "DOPPLER RADAR SPEED MEASURING UNIT". Other voltage sources could have been used including AC voltage supplies and other battery combinations. Diodes 48 and 160 are connected to the positive terminal of each battery 47, as shown, to prevent one battery 47 from charging the other battery 47. The anodes of diodes 48, 160 are connected to the positive terminals of batteries 47, and the cathodes of diodes 48, 160 are connected together. A mechanical double-pole-triple-throw switch 50 connects the cathodes of diodes 48, 160 to the TK11445 low dropout controllable voltage regulator 49. When switched to the "ON" position the mechanical switch 50 turns on the speed gun by connecting the voltage from diodes 48, 160 to the voltage regulator 49. The regulator 49 supplies +4.5 $V_x$ to a PIC16C72 microcontroller 45, which controls the operation of the speed gun. A capacitor 900 to ground filters voltage $V_x$. Battery 47 voltage is also supplied to a second +4.5 Vdc TK11445, controllable voltage regulator 51. However, it does not output a voltage until signaled by the microcontroller 45. Resistors 885, 870 and capacitor 880 filter the battery voltage into voltage regulator 51 and the control line from pin 6 of microcontroller 45 in FIG. 9. The microcontroller 45 generates a 20 KHz square wave at terminal 165 which is converted to approximately −2.5 Vdc to −3 Vdc $V_3$ by the charge pump circuit 52. This negative voltage is supplied to the LM324 quad operational amplifier 42 and to an LM385 −1.2 dc voltage regulator 53, which outputs a constant −1.2 Vdc. A resistor divider 54 adjusts the −1.2 Vdc to approximately −0.2 Vdc at terminal 170 and −0.3 Vdc at terminal 171 which are needed by the FETs (Field Effect Transistors) used in the microwave oscillator 13 and the microwave amplifier 32, respectively. After a predetermined delay the microcontroller 45 sends a control signal to the second voltage regulator 51 signaling it to supply +4.5 Vdc to the operational amplifier quadpack's 42, respective positive supply, and to the drain of the oscillator's FET 14. Note that +2 Vdc is supplied to the drains of the FETs 33 in the microwave amplifier 32. The delay insures that the negative voltage is applied to the FETs' 14, 33 gates before the positive drain voltage is applied, reducing the risk of damage to the FETs. One half of a second delay is used in the preferred embodiment. Other types of transistors can potentially be used for the microwave oscillator and amplifier, including BJTs (Bipolar Junction Transistors) and HBTs (Hetero Junction Transistors), whereby these may not require a negative voltage or may have a different turn on procedure. Also the FETs may be used in a self-biased circuit configuration requiring no negative voltage.

Figure 10:
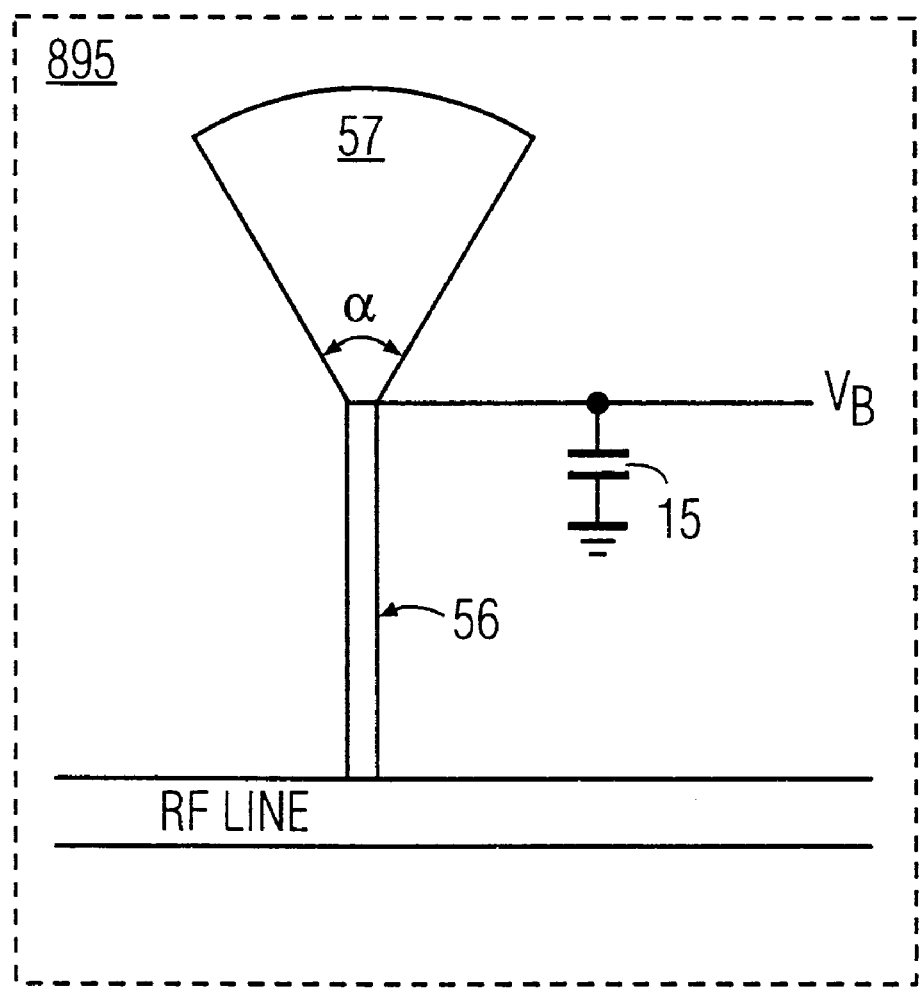
FIG. 10 shows dc bias circuitry for an embodiment of the invention.

Diode drops from three silicon diodes 55 reduce the positive voltage applied to the microwave amplifiers' drains to approximately two volts. Almost any type of diode can be used assuming it has the proper diode drop and can handle the required current. With +2 Vdc on the drains and −0.3 Vdc on the gate, the microwave amplifier 32 shown in FIG. 8 will draw approximately 40 mA. The amplifier 32 can be biased to other operating points to change the gain. Increased current draw will increase the amplifier's gain to a practical limit and correspondingly the speed measuring unit's sensitivity at the cost of battery lifetime, if powered by batteries. FIG. 10 shows the dc bias circuitry used in both amplifier 32 and oscillator 13. The gate and drain voltage for all FETs 14, 33 are applied through dc bias circuitry 895, shunted to the FET's 14, 33 gates and drains, respectively. As shown in FIG. 4 for the associated printed circuitry, the dc bias circuitry 895 consists of a 7 mil microstrip line 56 a quarter wavelength long (170 mils), attached to a quarter wavelength microstrip radial stub 57 at 10.525 GHz (120 mils radius with an angle of approximately 60 degrees). A 0.1 uF capacitor 15 is connected to the intersection of the radial stub 57 and the microstrip line 56 and to ground. The gate and drain voltages for FETs 14, 33 are applied to the non-grounded terminal of the capacitor. This bias circuitry 895 allows the voltage for the gate and drains of FET's 14, 33 to be applied while incurring little RF loss. This bias circuitry has a high impedance at 10.525 GHz. A resistor 412, 412a, or 35 is connected between the dc bias circuitry and the gate or drain voltage of FETs 33 to attenuate any microwave or RF signals that may be present.

The present radar gun monitors the battery voltage and displays a "LOW BAT" signal when the battery voltage falls below a certain level. A voltage divider 180 is connected to the DPTT switch 50, which is connected to the batteries 47 through diodes 48, 160, when the radar gun is in one of the "ON" modes (see FIG. 9). The divider 180 reduces the battery voltage to a level that can be sampled by the PIC16C72 microcontroller 45. Since the microcontroller 45 is biased by a regulated +4.5 Vdc, it can only sample voltages less than +4.5 Vdc. As shown in FIG. 9, a voltage divider 180 comprised of two one megohm resistors 181, 182 is used to divide the voltage derived from the batteries in half. Large resistance valves are used to minimize current consumption, in the preferred embodiment one megaohm resistors 181, 182 are used. A 0.1 uf capacitor 183 is connected to the center of the divider 180 to ground to stabilize the voltage. If the batteries 47 are at +6 Vdc, the inputted voltage into the voltage divider is approximately +5.3 Vdc because of the +0.7 Vdc diode drop across diodes 48, 160. +6 Vdc is a voltage at which 9 Vdc batteries have approximately one hour of life remaining in this application. A +2.65 Vdc voltage is therefore outputted from the voltage divider when the batteries 47 are at +6 Vdc and signifies that the batteries 47 should be replaced. The +2.65 Vdc voltage is well within the sampling range of the microcontroller 45.

As explained earlier, the present radar gun has four basic modes, an off mode, a continuous mode, a single shot trigger mode and a memory recall mode. In the single shot trigger mode the fastest speed detected within three seconds after pressing the trigger button is displayed. In the continuous mode the fastest speed detected every second is displayed. In the memory recall mode the previous ten valid speeds, which are stored in the microcontroller 45 are displayed.

With reference to FIGS. 9 and 7A, a Double-Pole-Triple-Throw (DPTT) switch 50 is used to move between the Off, Trigger and Continuous modes of operation. In the Off position the switch 50 is in the open position and the batteries 47 are not connected to the circuitry. In the "TRIGGER" and "CONTINUOUS" positions, the switch 50 connects the batteries to the electronic circuitry and turns on the radar gun. The microcontroller 45 is connected to a voltage divider 185 which outputs different voltages representing the radar gun's present operating mode. The voltage divider 185 includes a 10 kohm resistor 187 connected to the +4.5 V regulated supply 49, and is connected to Trigger switch 195, to DPTT switch 50, and to Memory Recall switch 193, which is connected to ground. Trigger switch 195 is connected to 5 kohm resistor 189. DPTT switch 50 is also connected to 10 kohm resistor 191. The 5 kohm resistor 189 and 10 kohm resistor 191 are each connected to one end in common to SPDT switch 702 and to the anode of green LED 700, in this example. The SPDT switch 702 and green LED 700 are connected in parallel and are connected to ground.

In the preferred embodiment, the radar gun is in the Trigger mode, when DPTT switch 50 is in its second position. With the radar gun in the Trigger mode and with Trigger switch 195 not pressed or closed, the output voltage from voltage divider 185 is +4.5 V. If Trigger switch 195 is pressed and with SPDT switch 702 closed, the output voltage from voltage divider 185 is +1.5 V, and alternatively with SPDT switch 702 open, the output voltage from voltage divider 185 is +2.9 V. The radar gun is in the Continuous mode when DPTT switch 50 is in its third position. With the radar gun in the Continuous mode and with SPDT switch 702 closed, the output voltage from voltage divider 185 is +2.25 V, and alternatively with SPDT switch 702 open, the output voltage from voltage divider 185 is +3.3 V. When the Memory Recall switch 193 is pressed to close the switch, the radar gun is placed in the Memory Recall mode. The Memory Recall switch 193 shorts the output voltage from voltage divider 185 to zero volts or ground.

The microcontroller 45 is programmed with the voltage values corresponding to the various operating modes. The microcontroller 45 samples the voltage from voltage divider 185, and places the radar gun in the appropriate operating mode. The SPDT switch 702 allows an increased number of operating modes to be included in the speed gun. Other modes include variations of the previously mentioned "CONTINUOUS AND TRIGGER" modes. Variations include storing measured speeds every 66 msec when triggered, thereby allowing one to see the acceleration or deceleration of an object on display 46. A second variation requires a moving object to travel faster than a certain threshold before the display in the Continuous mode will be changed. For example, the Continuous mode can continually update the display 46 for any measured speed or it can be made to update the display 46 only when speeds greater than 15 mph are measured. The latter mode is ideal for hands-free operation, especially when mounted on a tripod. The operation of SPDT switch 702 and the variations of the Continuous and Trigger modes are not included in the flowcharts for the sake of brevity.

An MGF1903B high-frequency field-effect-transistor (FET) 14 is used in the oscillator 13, and three MGF4918D type FETs 33 are used in the microwave receiver amplifier 32, and each requires low inductance paths to ground from their source leads. Source inductance in the FETs 14, 33 acts as a feedback mechanism and alters the operation of the oscillator and the amplifiers 13 and 32. Two 6 mil plated through via holes 140, shown in FIG. 2, are placed directly beneath each of the FET's 14, 33 source leads to minimize any inductance to ground. Typically, printed circuit boards using surface mount technology connect via holes to the surface mount components with a relatively long and narrow transmission line. This transmission line prevents solder from flowing into the via and away from the surface mount component where it is needed to form a proper solder joint. However, this technique cannot be used at 10.525 GHz. The relatively short wavelengths at 10.525 GHz, approximately 700 mils in RO4003 type PC boards, causes path lengths to appear as a significant inductance and necessitates that the plated through vias be placed as close as possible to the source electrodes of associated FETs. Very small diameter via holes can be used to minimize the flow of solder into the via holes. In the preferred embodiment, six mil diameter vias holes are used. To further alleviate this problem, the via holes can be plugged during the board construction. "PLUGGING" fills the via holes with solder preventing the solder used in mounting the components from flowing into the via holes. The location of the fifty ohm load resistor 144 used as a termination for the branch line coupler 23 is also important. The via 142 should be located adjacent to or beneath the ground connection of resistor 144 for optimum performance.

In all other areas of the present engineering prototype example of this invention, the vias to ground can be placed away from an associated component as is typically done. Only where microwave signals exist is the previously described technique needed.

For optimum operation, the oscillator 13, microwave amplifier 32 and branch line coupler 23 shown in FIG. 8 must be located on the RO4003 board such that the transmit power is maximized, the amplifier noise figure is minimized, and the mixer's Local Oscillator (LO) signal 146 is approximately 4 dBm. The Local Oscillator signal is carried by microstrip line 148a. The mixer 25 includes two low barrier (SMS3988) type Schottky diodes 37, in this example, requiring 0 dBm LO (local oscillator) power per diode or 3 dBm total. Assuming approximately 1 dB loss from the microstrip pattern used for the mixer 25 (see FIG. 4), 4 dBm LO power is required. If the mixer 25 receives less than the required LO power, its conversion loss will increase at a rate greater than a 1 dB increase in conversion loss for every 1 dB decrease in LO power. For example, if with a LO power of 4 dBm, the conversion loss of mixer 25 is 6 dB, then with a −6 dBm input its conversion loss may jump to 26 dB. Conversion loss is defined as the difference in power levels of the inputted microwave signal and the outputted Doppler Signal. In this example, a reduction of 10 dB LO power resulted in an extra 20 dB of conversion loss. These numbers are for purposes of illustration, and are not exact. However, they show the effect of operating the mixer 25 with insufficient LO power. If more LO power is inputted than required, the conversion loss remains relatively constant. The extra speed gun operating distance created by increasing transmit output power will be offset with an equal increase in noise figure. However, a decrease in mixer 25 LO power, if the current power level equals 4 dBm, cannot be offset with an equivalent increase in output power or an equivalent decrease in noise figure. Therefore placement of these components must emphasize first having the required LO power and then maximizing output power, while minimizing noise figure with a certain increase in output power being equivalent to the same decrease in noise figure. These components were designed to be connected with fifty ohm microstrip lines 148, 148a, 148b, which in eight mil RO4003 is eighteen mils wide, as shown in FIG. 4. In the preferred embodiment the oscillator 13 output power is approximately nine dBm at the notch of the oscillator's enclosure 21, the loss of the eighteen mil microstrip line 148, 148a, 148b is approximately 0.2 dB/inch, and the power levels of the coupler's 23 two output ports are approximately 3.3 dB below its input.

All functions in the present Doppler Radar Speed Measuring Unit can be located on the RO4003 four-layer board 1. However, for best performance it is only critical that the microwave oscillator 13 circuitry, coupler 23, mixer 25, microwave amplifier 32, antennae 24, 30, and possibly the first operational amplifier 40 be located on board 1. The display 46, the A/D and microcontroller 45, and any other non-microwave function can be located on a separate PCB, connected to the four-layer PCB. It should also be noted that any via holes and screw holes used should not interfere with the antenna pattern on the opposite side of the present PCB 1. In addition, all functions can be located on a two layer board. However, at 10.525 GHz the board's size will be significantly larger and the speed gun's operating range will be decreased by the need for long lengths of lossy microstrip lines. At higher frequencies, it may be advantageous to build the speed gun on a two layer board.

In the preferred embodiment, the module including PCB 1 and batteries 47 is secured inside a plastic housing 60 resembling a 35 mm camera, (see FIG. 7A and 7B). The module is secured inside the housing 60 with the antennas 24, 30 facing the front 61 of the housing (analogous to the side the lens is on in a 35 mm camera), and the circuitry facing the back 61a. There should be sufficient distance between the housing 60 and the electronic circuitry and antenna such that the plastic material of housing 60 does not alter the performance of the antenna or electronic circuitry. One hundred mil spacing was used in the completed radar gun. The transmitted signal 62 propagates through the plastic housing 60 to the target 29 and back through the plastic housing 60 to the receive antenna 30. The opposite side 61 a of the housing 60 contains an opening for an LCD display 46, in this example, or other display. A tripod mount (not shown) is built into the base of the housing 60. One end of the housing 60 is designed to be held by the radar gun's operator where the batteries are placed. This configuration discourages the operator from placing their hands in front of the antennae 24 and 30, which would degrade the radar guns performance. Switches 50, 193, and 195, 702 for the radar gun's various operating modes are built into the top of the housing 60, as shown. A means 63 to attach a camera strap is located on one side of the housing, preferably where the unit will be held 63. A drawing of the housing is shown in FIGS. 7A and 7B.

The present radar gun's operating range can be increased by increasing the gain of the microwave amplifier 32, increasing the output transmit power, and/or increasing the gain of the antennae 24 and/or 30 by either increasing their size or mounting a dielectric lens to the front of them. The present radar gun is currently limited by internally generated noise, the oscillator 1/f noise. Increasing the gain of the microwave amplifier 32 will increase the present radar gun's operating range by amplifying the received signal to a level greater than the 1/f noise. This method can be used until the received signal is masked externally by either the thermal noise floor or by an external environmental noise. Increasing the output power will increase the radar gun's operating distance, however, battery lifetimes will be cut drastically and the parts cost will increase. Thermal issues may also arise. Higher gain antennas 24, 30 will increase the gun's distance. However, to double the distance, the combined area of the receive and transmit antennas requires increasing by approximately four times their present size, which for a handheld unit is prohibitive. Increasing output power and increasing the gain of the transmit antenna 24 will increase the radiated electric field, which is regulated by the FCC. Reducing the system bandwidth with analog filters and/or using Digital signal processing techniques such as FFTs (fast fourier transforms) which effectively lower the systems noise floor, allows weaker signals to be detected and therefore increases the gun's range.

The present engineering prototype of the radar speed gun is accurate to less than +/−0.5 mph. The total possible error is the sum of all the individual errors. The main errors are caused by the frequency of oscillator 13 being different than desired, due to oscillator drift over an extended period of time and due to the oscillator not being at the exact frequency when constructed, by the frequency drifting during measurement, and by errors incurred in determining the Doppler shift. At the present radar gun's preferred operating frequency, 10.525 Ghz, an object that moves one mph creates a Doppler shift equal to 31.38 Hz. If the oscillator 13 is not operating at the desired frequency, 31.38 Hz will be incorrect and the speed calculations will be in error. Another error is caused by a drift in the frequency of oscillator 13 during measurement, as previously mentioned. Since the system mixes the oscillator signal with the reflected Doppler shifted signal, any change in oscillator frequency during this period will cause the Doppler frequency shift to be in error. All oscillators drift over a certain frequency range. To minimize drift, free running oscillators (those that are not phase locked) are locked to a high Q resonance. Typically the greater the Q the narrower the bandwidth over which the oscillator drifts. As shown in FIG. 8, oscillator 13 is locked to the desired frequency by a type DRD065FC029 dielectric resonator 17, in this example. This resonator 17 has very little loss as exhibited by its extremely high unloaded Q, a quality factor greater than 25000 at 10 GHz. The dielectric resonator 17 is mounted to a boron nitride substrate 16 to minimize any loading effects by the RO4003 substrate of PCB 1, as shown in FIG. 5. If the dielectric resonator 17 was glued directly to the RO4003 substrate of PCB 1, the resonator's Q would effectively be lowered by the relatively lossy substrate. In comparison, Gunn diode oscillators are locked to the desired frequency by a waveguide cavity, which typically have Qs<10000, a fraction of a DRD065FC029 resonator 17. The present dielectric resonator 17 based oscillator therefore has less tendency to drift, resulting in potentially less measurement error.

The Doppler shift is determined by sampling the received target reflected waveform and effectively counting the number of half cycles in a given period. The accuracy of this method is determined by the accuracy of the system clock, by the sampling rate and by the time period over which the sampling takes place. In the embodiment shown in FIG. 9, the clock accuracy is determined by the resonator 83 connected to microcontroller 45, which for the EFO-EC4004A4 resonator used is 0.1%. If more accuracy is required, quartz crystals with accuracy better than 0.1% can be used. However, they are slightly more expensive. A sample rate should be chosen that is at least twice the highest frequency present to avoid aliasing and should be greater than this to avoid missing half periods when counting the number of periods. In the embodiment shown, a sampling rate of 30 kHz is used, which is approximately eight times the highest frequency of interest. The uncertainty of this technique is +/−¼ of a cycle. The percentage error is +/−¼ cycle divided by the number of cycles in the sample period. Measurements of objects traveling at high speeds have percentage errors less than those traveling at slower speeds, since more cycles are present during a given time period. However, the absolute error for all speeds are equal. For a measurement time period of 33 milliseconds the absolute error is +/−0.24 mph, not including the inaccuracy of the clock and drift of the oscillator 13. To increase accuracy sampling must be made over a larger time period. The total of these uncertainties for speeds to 128 mph is less than 0.4 mph.

In the embodiment shown, the output power is approximately three milliwatts, and the antennas 24, 30 have approximately 18 dB of gain.

The following is a list of the key hardware components, and their sources, which comprises the hardware used in the above embodiment: one custom made RO4003 four-layer board 1 material by Rogers Corporation, Chandler, Ariz.; one custom made FR4 two-layer board (not needed if everything is put on RO4003 board); one MGF1903B FET 14, Mitsubishi Electronics Corporation, Tokyo, Japan; three MGF4918D FETs 33, Mitsubishi Electronics Corporation, Tokyo, Japan; SMS3988 series pair Schottky diodes 37, Alpha Industries Inc., Woburn, Mass.; two TK11445 voltage regulators 49, 51, Toko America Inc., Mt. Prospect, Ill.; one LM324 operational amplifier quad pack 42, National Semiconductor, Santa Clara, Calif.; one LM385 −1.2 voltage reference 53, National Semiconductor, Santa Clara, Calif.; one PIC16C72 microcontroller 45, Microchip Technology Inc., Chandler, Ariz.; one VI-302-DP-RC-S LCD 46, Varitronix LTD., Hong Kong; one DRD065FC029 dielectric resonator 17, Murata Erie North America, Smyrna, Ga.; one EFO-EC4004A4 4 MHz resonator 83, Matshushita Electric Corporation of America (Panasonic), Secaucus, N.J.; seven GRM40COG010C050BD 1 pf capacitors 34, 28 Murata Erie North America, Smyrna, Ga.; a sufficient quantity of Gel Bond Adhesive −#199, Trans-Tech Inc, Adamstown, MD; one 110-91-640-41-105 dual-in-line socket (not shown), surface mount open frame, Mill-Max Mfg. Corp., Oyster Bay, N.Y. 11771 (if LCD 46 is surface mounted to RO4003 board); one 100 mils square 62 mils thick boron nitride substrate 16; one custom aluminum (metallized) enclosure 18; two TL1100C, (E-Switch, Brooklyn Park, Minn.) push momentary switches 193, 195; 1N4001 diodes 48, 160, 55; 10 kohm resistors; and various other discrete components as required, including two nine volt battery connectors for batteries 47, a double-pole-triple-throw switch 50 and a single-pole-double-throw switch 702.

With further reference to FIG. 8, other portions of the circuitry will now be described. The transmit antenna 24 is connected through two series connected one picofarad capacitors 28 to the branch line coupler 23. A 1.0 picofarad capacitor 34 connects coupler 23 to an output end of microstrip 22 or conductor of oscillator 13, as shown. The other end of microstrip 22 is connected in common to an end of capacitor 15, to the drain of MESFET 14, and to receive a source of dc voltage $V_1$, in this example, +4.5 volts dc. Also, another capacitor 15 is connected between ground or a source of reference potential, and the common connector of microstrip 400 and dc bias voltage $V_2$. In this example, $V_2$ is −0.2 volt dc and is applied to the gate of FET 14.

The IF (intermediate frequency) gain block 40 further includes operational amplifier 40A having voltage connections between sources of voltage $V_1$ and $V_3$. In this example, $V_3$ is approximately −2.5 volts dc. Amplifier 40A also includes an inverting terminal connected in common to one end of each of grounding resistor 402, capacitor 112, and feedback resistor 404. The other end of feedback resistor 404 is connected in common to the output of amplifier 40A and one end of resistor 408 of lowpass filter 41. Resistor 402 is 1 kohm, resistor 404 is 47 kohm, resistor 406 is 4.7 kohm, and resistor 408 is 2.2 kohm, in this example.

The lowpass filter 41 further includes another resistor 408, capacitors 410 and 414, and an operational amplifier 411. For the sake of brevity, the connections of these components will not be described herein, and reference to FIG. 8 is intended for showing the connections thereof. Note that in this example, capacitor 410 is 0.01 microfarad, and capacitor 414 is 0.022 microfarad.

The gain block 110 further includes resistors 402, 404, and 406, and an operational amplifier 110A connected as shown. Capacitor 114 serves as a coupling capacitor between the output of lowpass filter 41 and the inverting input terminal of amplifier 110A.

The receive amplifier 32 further includes resistors 412, and bias voltage terminals $V_4$ and $V_5$ for receiving dc operating voltages of +2.0 volts dc, and −0.3 volt dc, respectively, in this example. The resistors 412 each have a value of 10 ohms. The resistor 412a has a value of 75 Ω.

With reference to FIG. 9, operating voltages $V_1$ and $V_4$ are provided by voltage regulator 51 connected to voltage supply circuitry including capacitors 15, diodes 55, and a 100 kohm resistors 890, connected as shown, in this example. Also further included in the negative operating voltage supply section 52 are two 1N4001 diodes 426, three 1.0 microfarad capacitors 414, one 2.2 kohm resistor 422, and 500 ohm resistors 424, 418 and 4.7 kohm resistor 416 and 1 kohm resistor 420, for example, connected as shown to voltage regulator 53 to provide negative dc operating voltages $V_2$ and $V_5$.

With further reference to FIG. 4, the pattern 6 for the conductor paths and/or microstrip for oscillator 13 must be designed to optimize performance of the oscillator 13. To attain this, care must be taken in the oscillator pattern design, including circuit conductor widths, lengths, and spacing. In this example, microstrips or conductors 400 and 428 are parallel to one another and spaced 376 mils apart and are 18 mils wide. Microstrips 428 and 22 are parallel and spaced 108 mils apart. The ground pad 150 upon which aluminum housing 18 is mounted has dimensions of 150 mils thick for $d_1$, 170 mils thick for $d_2$ and $d_3$, and 140 mils for $d_4$. The gap or break 460 in ground pad 150 is 140 mils. Microstrip 400 is parallel to one side of 150 and the center of the dielectric resonator 17 is spaced 433 mils from the one side, and is 340 mils from the side of the ground ring 150 containing notch 460. Microstrip 22 is also parallel to an opposing side of pad 150 and spaced 260 mils therefrom. The radius of curvature of the lower portion of conductor 400 is 35 mils, and the length of the conductor path 429 connecting microstrip 400 to strip pad 430 is 72 mils. The thickness of pad 430 is 30 mils. The length of pad 430 is 228 mils. The length of pad 432 is 40 mils, and its width is 30 mils. Pad 432 is spaced 70 mils from pad 438, the latter being 75 mils long and 30 mils thick. Floating pads 434 and 436 are spaced 70 mils apart, and one each 83 mils long and 50 mils thick or wide. Pad 440 is 200 mils long and 30 mils thick or wide. Connecting circuit path 442 is 68 mils long between pads 440 and 444 and is 18 mils wide. Pad 444 is 140 mils long and 24 mils wide. Microstrip 469 is 18 mils wide and is connected to pad 444 and to microstrip 471 by a bend with a radius of 20 mils. Pad 440 is spaced 68 mils from microstrip 471. Microstrips 472 are 22 mils long and 10 mils wide and connect both oval conductor patterns 450 to microstrip 471. Microstrip 472 is spaced 62 mils from microstrip 469. The end of microstrip 400 is 348 mils from microstrip 429 and is even with the end of microstrip 428 and is spaced 210 mils from ground ring 150. Microstrip 428 is connected by a 64 mils long conductor 446 to a 63 mils long microstrip portion 448 that is 14 mils wide, for its last 20 mils, and is otherwise 18 mils wide. The end of 448 connects to one end of an open oval conductor pattern portion 450, the other end of which is connected to one end of microstrip 22. Microstrip 22 is 14 mils wide for its last 20 mils end portion, but is elsewhere 18 mils thick and runs through the middle of notch 460. The diameters of the semicircular ends of pattern portion 450 have diameters of 96 mils, and are about 10 mils thick. Both ovals 450 extend an extra 10 mils before connecting to microstrips 448 and 22. Circuit pads 452 are each about 50 mils square.

DETAILED DESCRIPTION OF THE SOFTWARE ROUTINES

Figure 11:
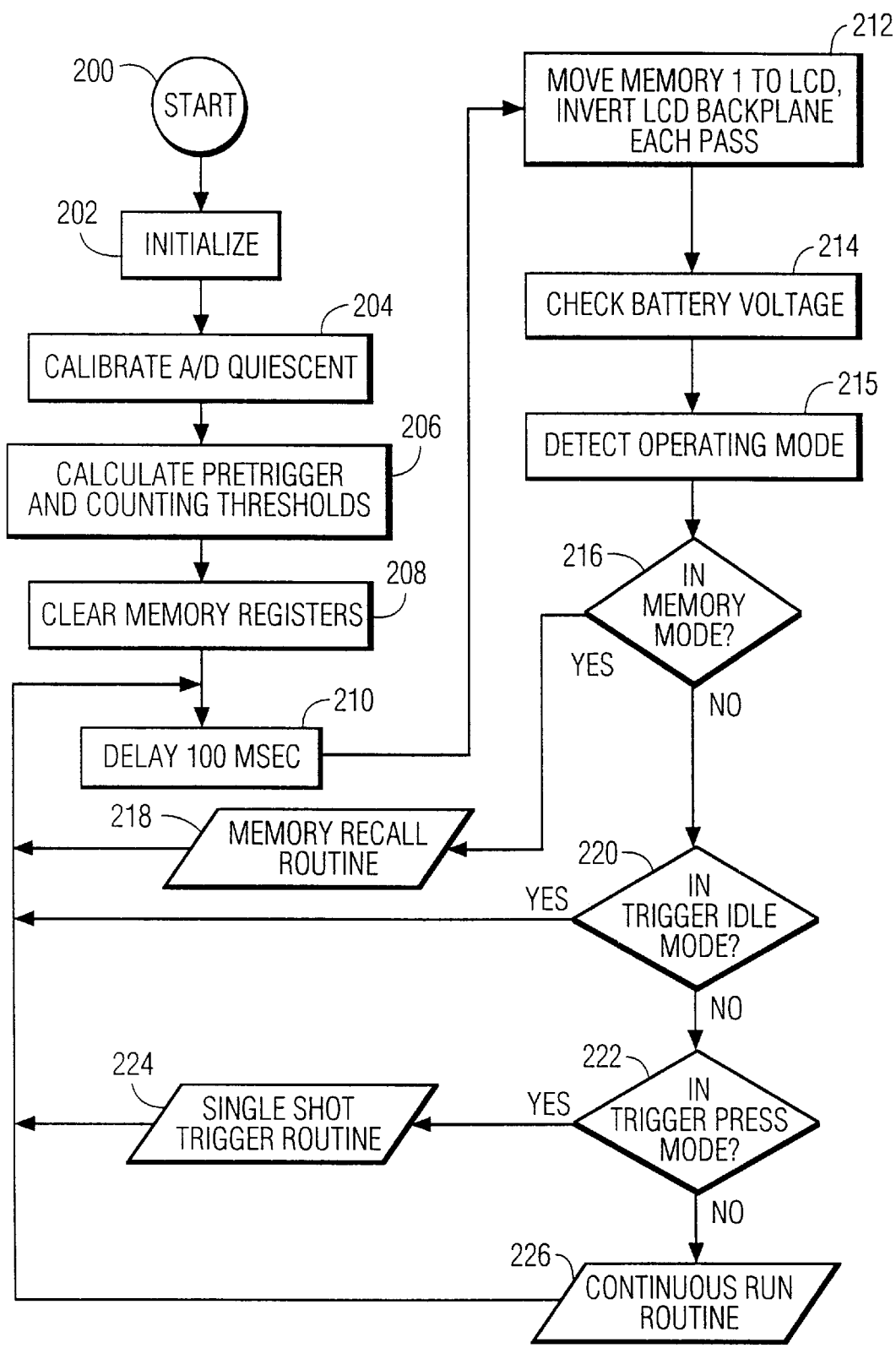
FIG. 11 shows a flowchart for a Main Software Routine for one embodiment of the invention.

The Main Software Routine is shown in FIG. 11 in flowchart form, wherein each step is illustrated by a designation number. The Main Software Routine is responsible for determining the A/D quiescent voltage, calculating the pretrigger and counting thresholds, displaying the speed on the LCD 46, checking the battery voltage and controlling the present speed gun in its various operating modes. Upon power up, step 200, of the microcontroller 45 and initialization, step 202, a measurement is made of the A/D's actual quiescent point at the A/D Doppler input port of microcontroller 45 via step 204. The correct value is important for determining optimal detection thresholds above and below the midpoint, which is needed to count alternate positive and negative half cycles of the input Doppler signal. The port is biased to its midpoint using two 10 kohm resistors 44R1 and 44R2, however, the actual bias may be slightly off due to normal component tolerances. The A/D QUIESCENT should be approximately 128 binary midway between 0 and 255, the range for the eight bit microcontroller 45.

Next, the pretrigger and counting thresholds are calculated in step 206. The pretrigger levels are the amplitudes the signal must cross before counting can begin. The pretrigger levels are represented by the variables "PRERESET" and "PRESET". "PRERESET" is the A/D QUIESCENT value −2, and "PRESET" is the A/D QUIESCENT value +2, on a binary scale from 0 to 255. The counting thresholds are the amplitudes used to determine whether the Doppler signal is in the positive or negative half cycles. These thresholds are represented by "RESET" and "SET". "RESET" is the A/D quiescent value −1 and "SET" is the A/D QUIESCENT value +1 on a binary scale. For example, if the A/D QUIESCENT is 128 then "PRERESET"=126, "PRESET"=130, "RESET"=127 and "SET"=129. The memory registers of microcontroller 45 are then cleared in step 208, and the main loop of the main software routine begins. The microcontroller 45 then delays for 100 milliseconds in step 210, for aesthetic purposes when viewing the LCD 46. Memory "1" (not shown) is then displayed on the LCD 46 in step 212, and the backplane of LCD 46 is inverted.

The microcontroller 45 then checks the voltage of batteries 47 in step 214, by sampling the voltage divider 180 connected to the batteries 47. If the batteries 47 are weak, this condition is stored in memory. In this example, the batteries 47 are nine volt batteries, and a weak condition is when the voltage is below 6 Vdc. The microcontroller 45 then polls the voltage divider 185 in step 215 to determine what mode the radar gun is in. If the gun is in the memory mode via step 216, i.e. the memory recall button 193 was pressed, causing the main routine to jump to the memory recall routine of step 218. If the gun was not in the memory mode, step 220 is entered to determine whether or not it is in the trigger idle mode (i.e. in the trigger mode waiting for the trigger button 195 to be pressed). If it is in the trigger idle mode, the routine jumps to step 210, the start of the main loop. If the gun was not in the trigger idle mode, it decides whether or not it is in the trigger press mode via step 222 (the gun is in the trigger mode and the trigger button 195 was just pressed). If it is in this mode, the program jumps to the single shot trigger routine step 224. Otherwise the gun has to be in the continuous mode, and therefore it jumps to the continuous run routine step 226. Upon return from these routines the program jumps to the start of the main loop step 210.

Figure 12A:
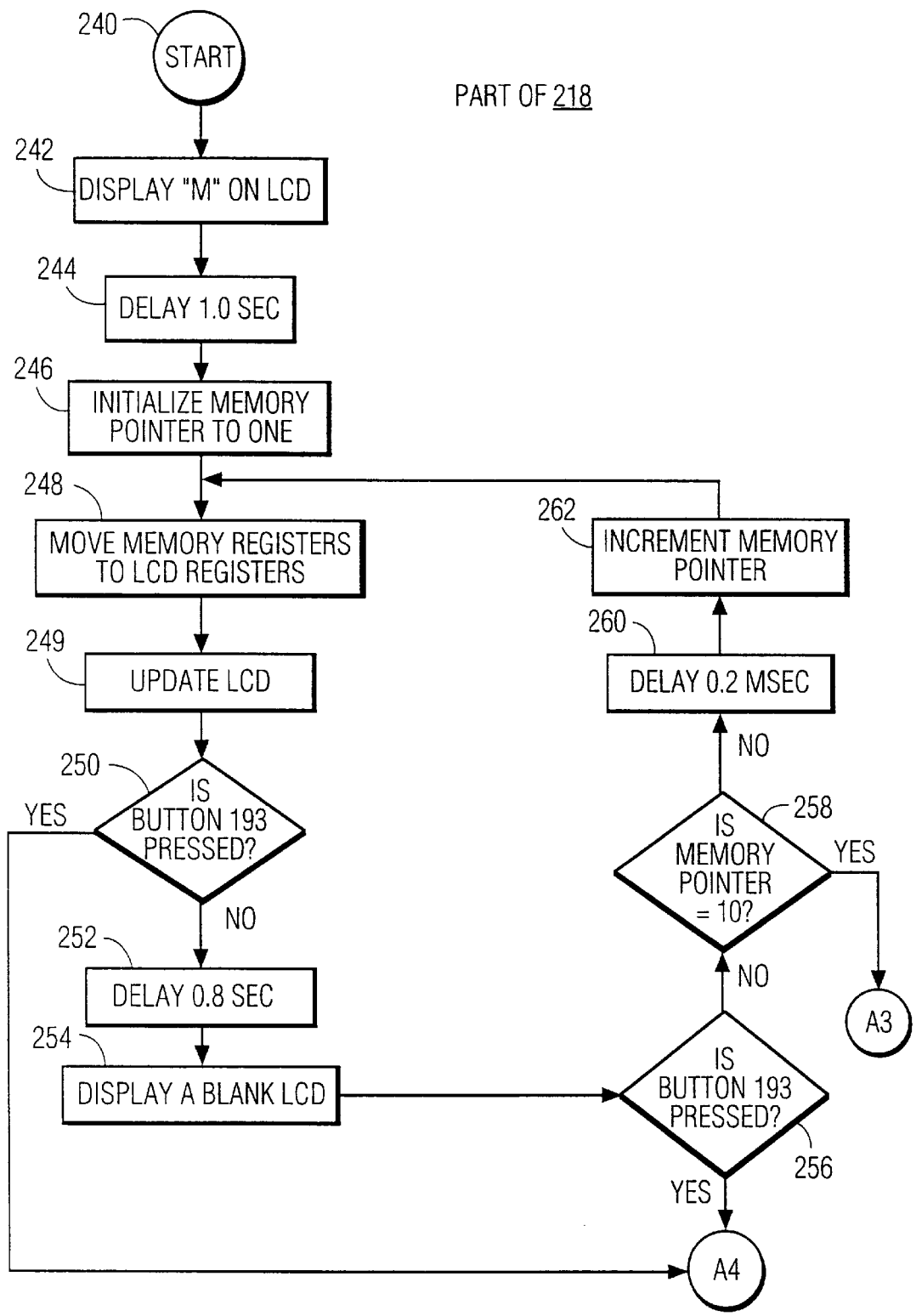
FIGS. 12A and 12B show a flowchart for a Memory Recall Mode Routine for one embodiment of the invention.
Figure 12B:
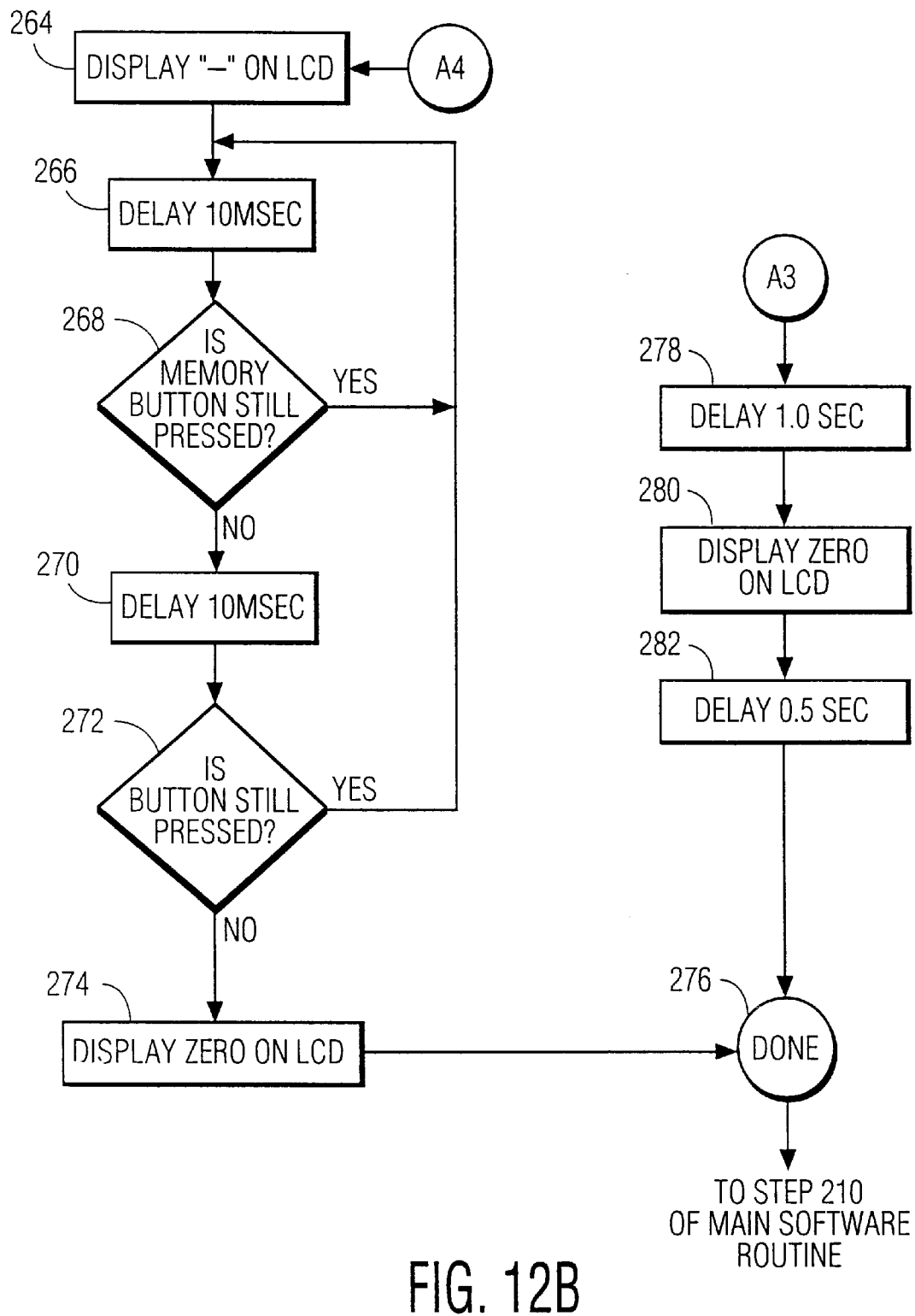

FIGS. 12A and 12B show a flow diagram of the Memory Recall Mode Routine, wherein each step is illustrated by a designation number. The Memory Recall Mode Routine is responsible for displaying the ten most recent valid speeds with the most recent speed first. The routine allows the operator approximately one second to release the memory recall button 193 before the routine jumps back to the main program. While displaying the stored speeds, the routine allows the operator to return to the main program if the memory recall button 193 is pressed. Upon pressing the memory recall button 193 on the radar gun and jumping to the memory recall mode start step 240, an "M" is displayed via step 242, on the LCD 46 signifying that the most recent speed will be displayed first. Next, the program goes through a delay for one second in step 244, to allow the operator to release the button 193 and then initializes the memory pointer to one via step 246. The first memory register is then moved to the LCD register in step 248, and displayed via step 249 on the LCD 46. The routine via step 250 then decides whether the memory button 193 is being pressed. If the memory button 193 is not being pressed, the routine delays 0.8 seconds via step 252, and proceeds to display a blank LCD via step 254. The 0.8 second delay gives the operator enough time to see the displayed speed and the blank LCD 46 lets the operator know that a new speed is about to be displayed. In step 256 the routine then checks to make sure the button 193 is not pressed. If it is not pressed or activated, the routine checks to see if the memory pointer is ten, i.e. whether or not the ten speeds in memory have been displayed via step 258. If not, the routine delays by 0.2 second in step 260, and then increments the memory pointer by one in step 262. The program then jumps to step 248, the beginning of the memory loop, and repeats the process of displaying the speeds. If the memory recall button 193 had been pressed when checked in the loop at steps 250 or 256, the routine would have jumped out of the loop and displayed "–" on the LCD 46 via step 264. The routine then enters a loop to decide when the button 193 is not pressed. First, the program delays 10 msec via step 266 and then decides whether the button 193 is pressed via step 268. If the button 193 is still pressed the program jumps to step 266 and re-enters the loop. If the button 193 was not pressed, the routine delays ten msec via step 270, then step 272 is entered to check to see if the button 193 is pressed. If pressed, the routine jumps back to step 266 to the first delay and repeats the process. This process ensures that memory recall button 193 is no longer pressed before returning to the main program. If the button 193 was not pressed, a zero is displayed on the LCD 46 via step 274, and the program returns via step 276 to step 210 of main program. If the routine remained in the first loop of this routine, because the memory recall button 193 was not pressed, the routine checks if the memory pointer equaled ten. If so, the routine jumps out of the loop from step 258 to step 278 to delay one second, and then move to step 280 to display a zero on the LCD 46, and then delays for 0.5 second via step 282 to signal the operator that the tenth speed has been displayed. The routine then returns via step 276, to the main routine step 210.

Figure 13:
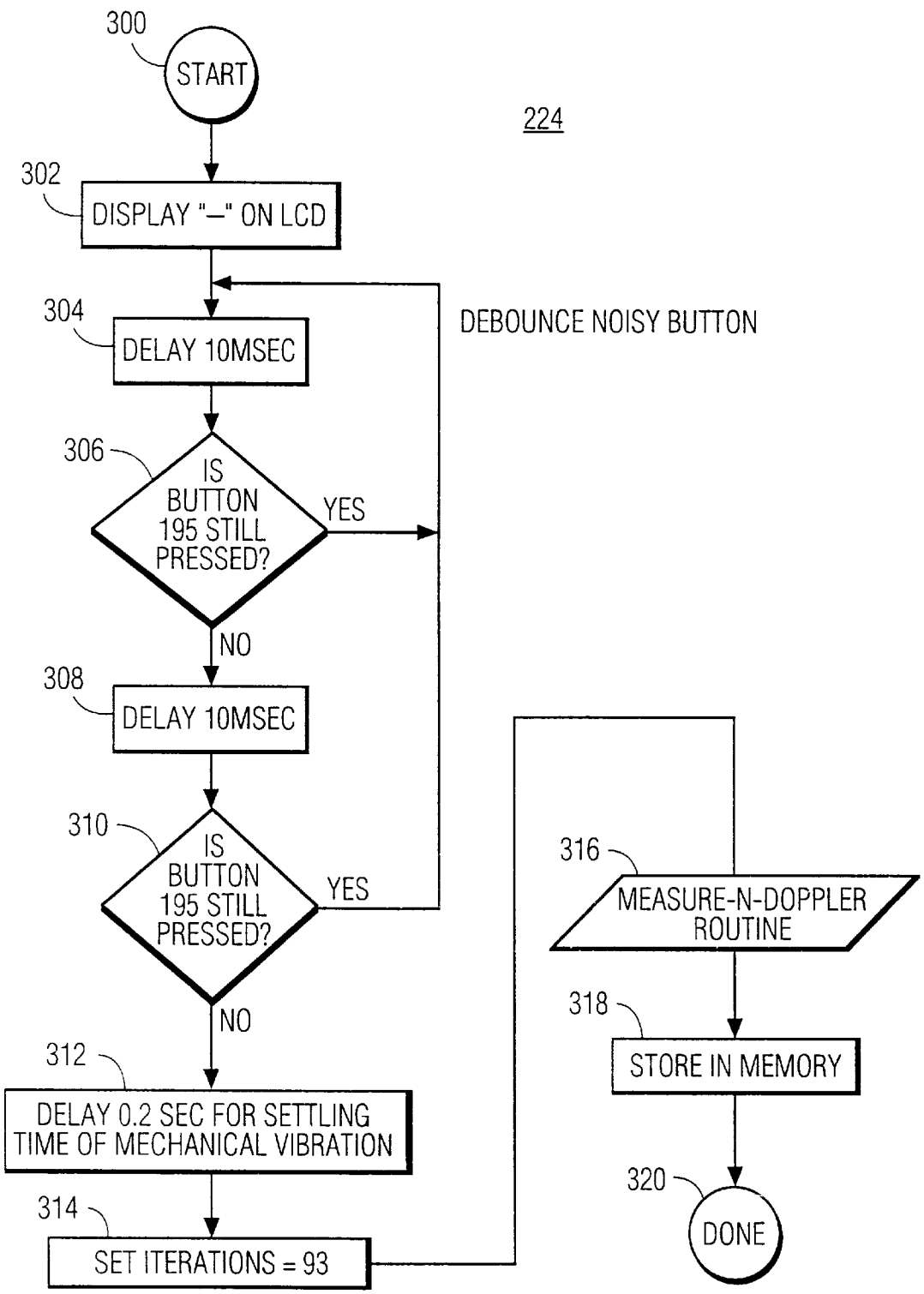
FIGS. 13 through 16 show flowcharts for a Single-Shot Trigger Mode Routine, a Continuous Run Mode Routine, an A/D Sample Routine, and a Measure-n-Doppler Routine, respectively, for one embodiment of the invention.

FIG. 13 shows a flow diagram for a Single Shot Trigger Mode Routine, wherein each step is illustrated by a designation number. The main program jumps via step 224 to the Single Shot Trigger Mode Routine, when the radar gun is put in the trigger mode and the trigger button 195 is pressed. The Single Shot Trigger Mode Routine calculates the fastest speed detected by the radar gun within approximately three seconds after the trigger button 195 is pressed, while in the trigger mode. The value is stored in memory and returned to the main program. Upon starting, in step 300 the Single Shot Trigger Mode Routine, a "–" is displayed on the LCD 46 via step 302. This is for aesthetic purposes while looking at the LCD 46. The program then delays for ten milliseconds via step 304, and checks via step 306 to see if the trigger button 195 is still pressed. If the button 195 is pressed, the routine loops back one step to step 304 for a ten milliseconds delay. This loop continues until the program determines that the button 195 is no longer pressed. The routine then delays for ten millisecond via step 308, and then again checks via step 310, to see if the button 195 is pressed. If the button 195 is again pressed, the routine jumps to the first delay step 304, and repeats the process of determining when the trigger button 195 is no longer pressed. This process insures that the trigger button 195 is no longer pressed, even if button 195 is pressed during noisy signal conditions that may momentarily make it appear the button 195 is not pressed. If via step 310 the routine decides that the button 195 is no longer pressed, the routine delays 0.2 second via step 312 to allow any mechanical vibrations induced by the trigger button 195 to dampen. Mechanical vibrations can shift the oscillation frequency, causing measurement errors. Next, the variable "ITERATIONS" which defines the number of iterations the Measure-n-Doppler Routine will perform is set to 93 in step 314. This is equivalent to approximately three seconds of measurements after the trigger button 195 is pressed. The routine then jumps to the Measure-n-Doppler Routine step 316 to determine the fastest detected speed. Upon returning to the program from the Measure-n-Doppler Routine step 316 to step 318, the Single Shot Trigger Mode Routine stores the speed in memory, and returns via step 320, to the main routine step 210.

Figure 14:
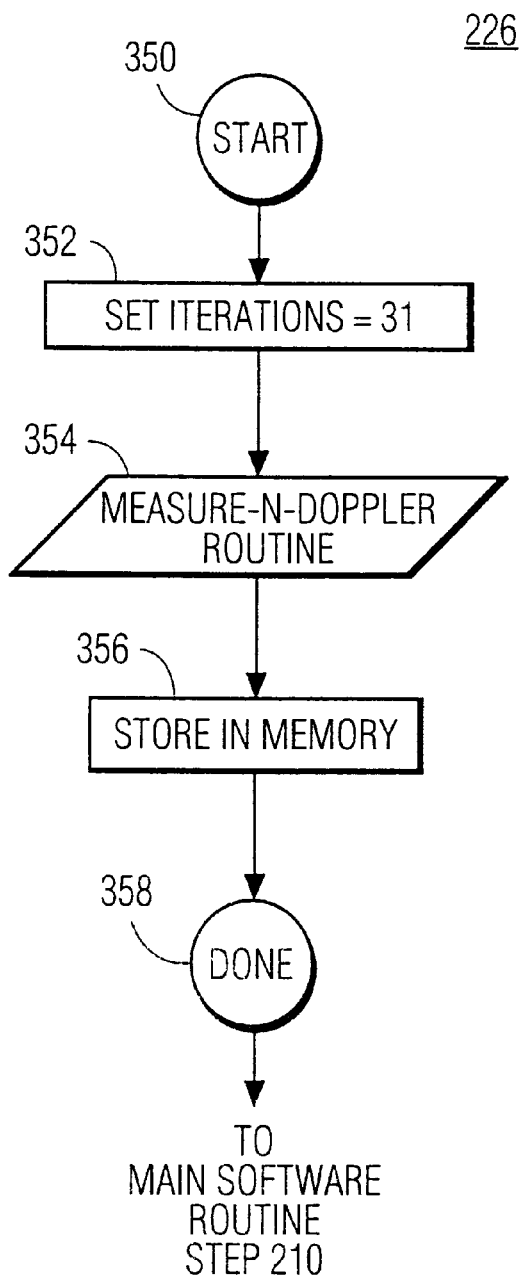

FIG. 14 shows a flow diagram of the Continuous Run Mode Routine, wherein each step is illustrated by a designation number. The main program jumps via step 226 to the continuous run mode routine, when the radar gun is put in the continuous mode. The Continuous Run Mode Routine calculates the fastest speed detected one second after entering the routine. The value is stored in memory, and control is returned to step 210 of the Main Software Routine Program. Upon entering step 350 of the Continuous Run Mode Routine, the program sets the variable "ITERATIONS"=31 via step 352. The variable "ITERATIONS" defines the number of iterations the "MEASURE-N-DOPPLER ROUTINE" will perform in step 354. In the embodiment shown, thirty-one iterations is equivalent to approximately one second of measurements. The routine then jumps to step 354, to the Measure-n-Doppler Routine to calculate the fastest speed measured. The speed is stored in memory via step 356 for display by the Main Software Routine. Next, in step 358, the Continuous Run Mode Routine is completed, and control is transferred step 210 of the Main Software Routine.

Figure 15:
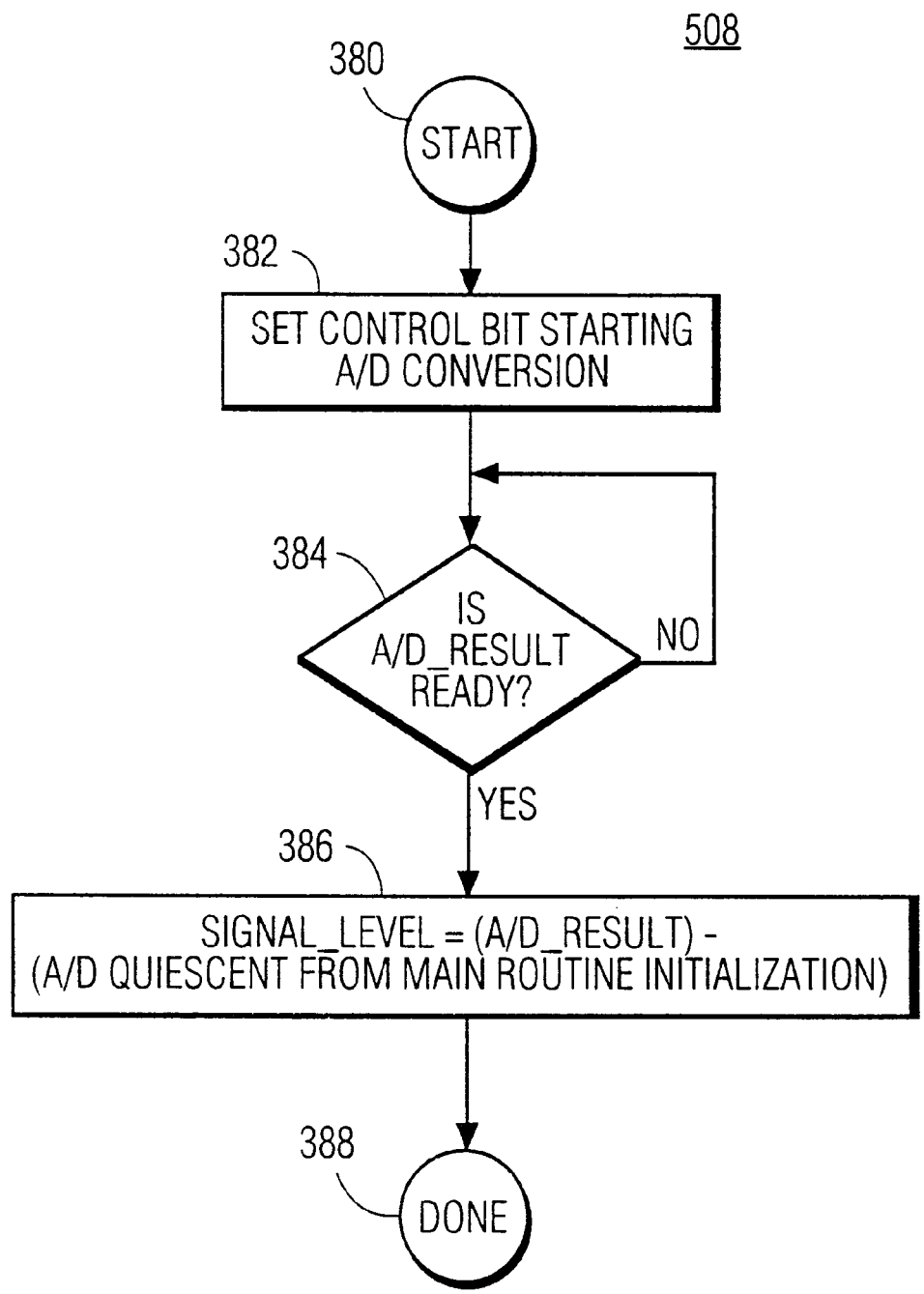

FIG. 15 shows a flow diagram of the A/D sample routine, wherein each step is illustrated by a designation number. The A/D sample routine is called by the Measure Doppler Routine 508, 518, 531 (see FIG. 17A, B) to determine the variable "SIGNAL_LEVEL", which is the Doppler signal voltage minus the A/D QUIESCENT voltage. Upon entering the A/D sample routine via step 380, the control bit setting the A/D conversion is set in step 382. Next, in step 384 the A/D sample routine then checks and continues to check whether or not the A/D_RESULT is ready. When the routine determines that the A/D_RESULT is ready, step 386 is entered, in which the routine subtracts the A/D quiescent value from the A/D_RESULT and assigns it to a variable "SIGNAL_LEVEL". This variable "SIGNAL_LEVEL" is then returned via step 388 to the Measure Doppler Routine 508, 518, 531 (see FIG. 17A, B).

Figure 16:
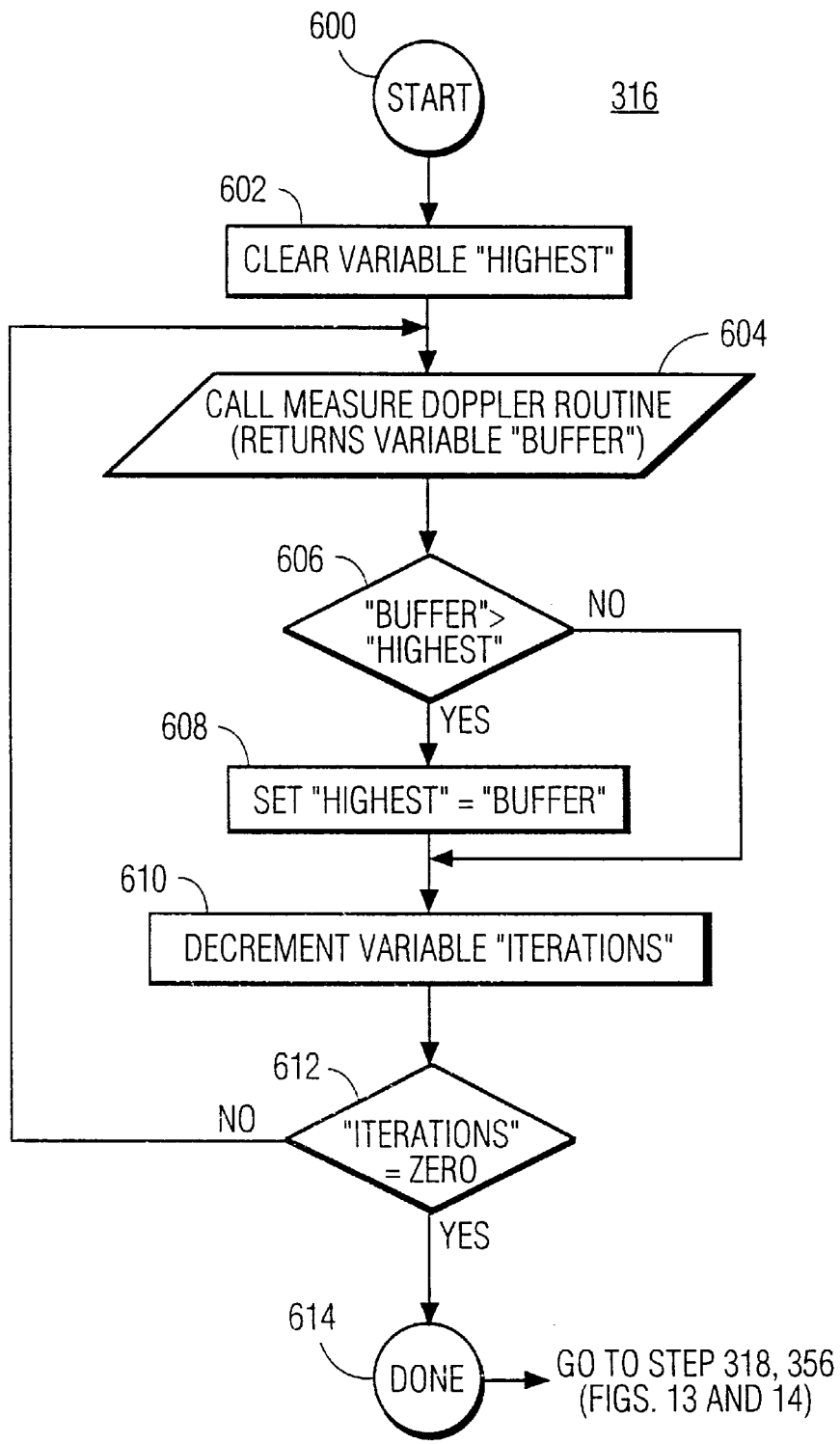

FIG. 16 shows a flow diagram of the Measure-n-Doppler Routine, wherein each step is illustrated by a designation number. The Measure-n-Doppler Routine determines the highest speed detected in a certain time interval. Upon entering the Measure-n-Doppler Routine via start step 600, the routine clears the variable "HIGHEST" in step 602, which represents the fastest measured speed. The Measure Doppler Routine is then called to measure the Doppler shift via step 604. The variable "BUFFER" is returned to the Measure-Doppler Routine and represents the number of cycles counted during a given time interval. "BUFFER" is compared with "HIGHEST" via step 606, and if "BUFFER" is greater than "HIGHEST", its value is assigned to "HIGHEST" via step 608, and represents the fastest speed detected during this running of Measure-n-Doppler Routine. The variable "ITERATIONS" represents the number of iterations the speed gun measures speed in a given mode. In trigger mode, the gun has been programmed to display the greatest speed detected approximately three seconds after pressing the trigger button 195. In the continuous mode the greatest speed detected every second is displayed. These time periods can be altered by changing the value of "ITERATIONS". The variable "ITERATIONS" is then decremented by one in step 610. Next, in step 612, the routine decides whether "ITERATIONS"=0. If it is, then the routine returns via step 614 to the routine which called the Measure-n-Doppler Routine either step 316 or step 354, and proceeds to step 318 or 356 (see FIGS. 13 and 14). If "ITERATIONS">0 the routine jumps back to step 604 to do another iteration.

Figure 17A:
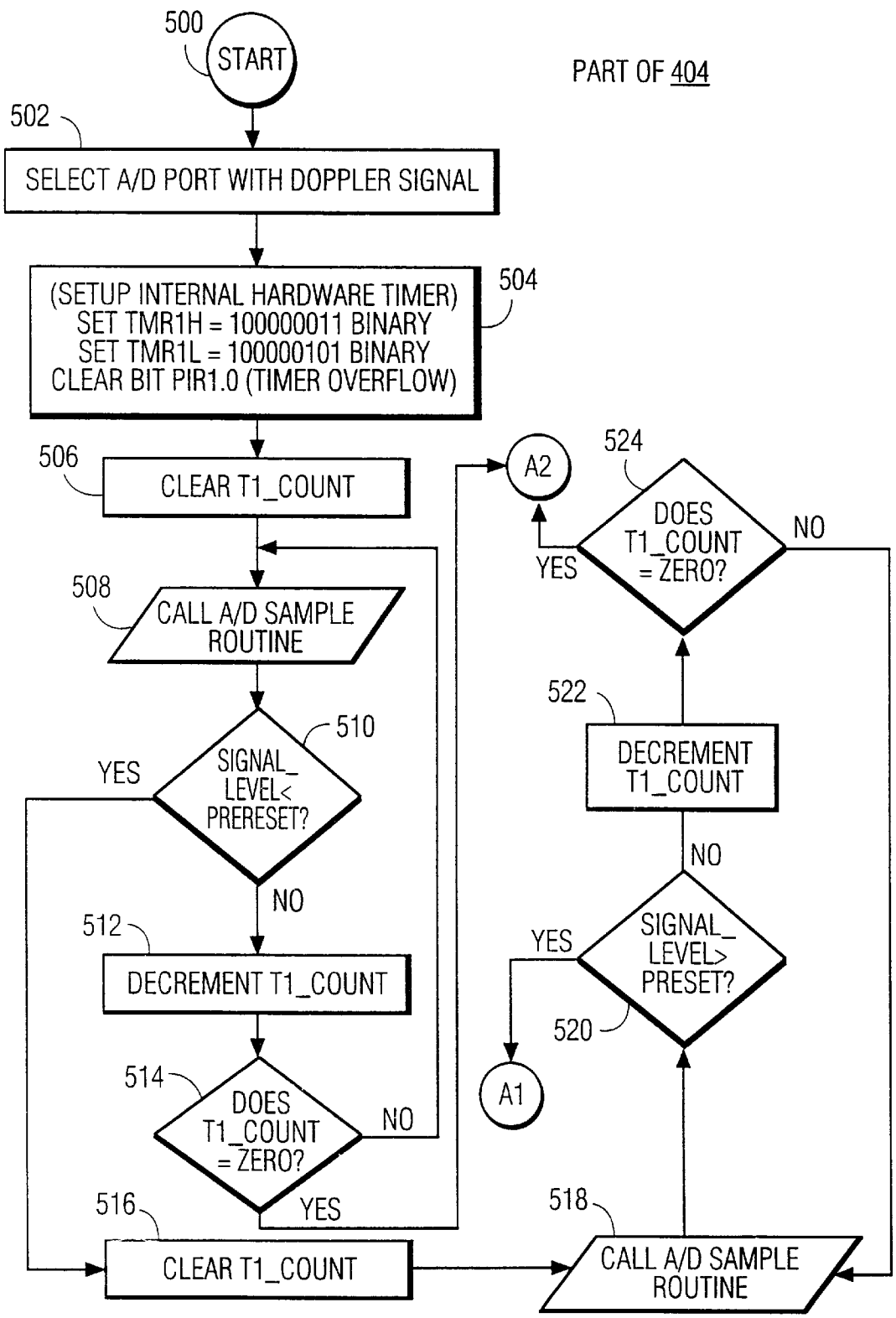
FIGS. 17A and 17B show flowcharts for a Measure Doppler Routine, for one embodiment of the invention.
Figure 17B:
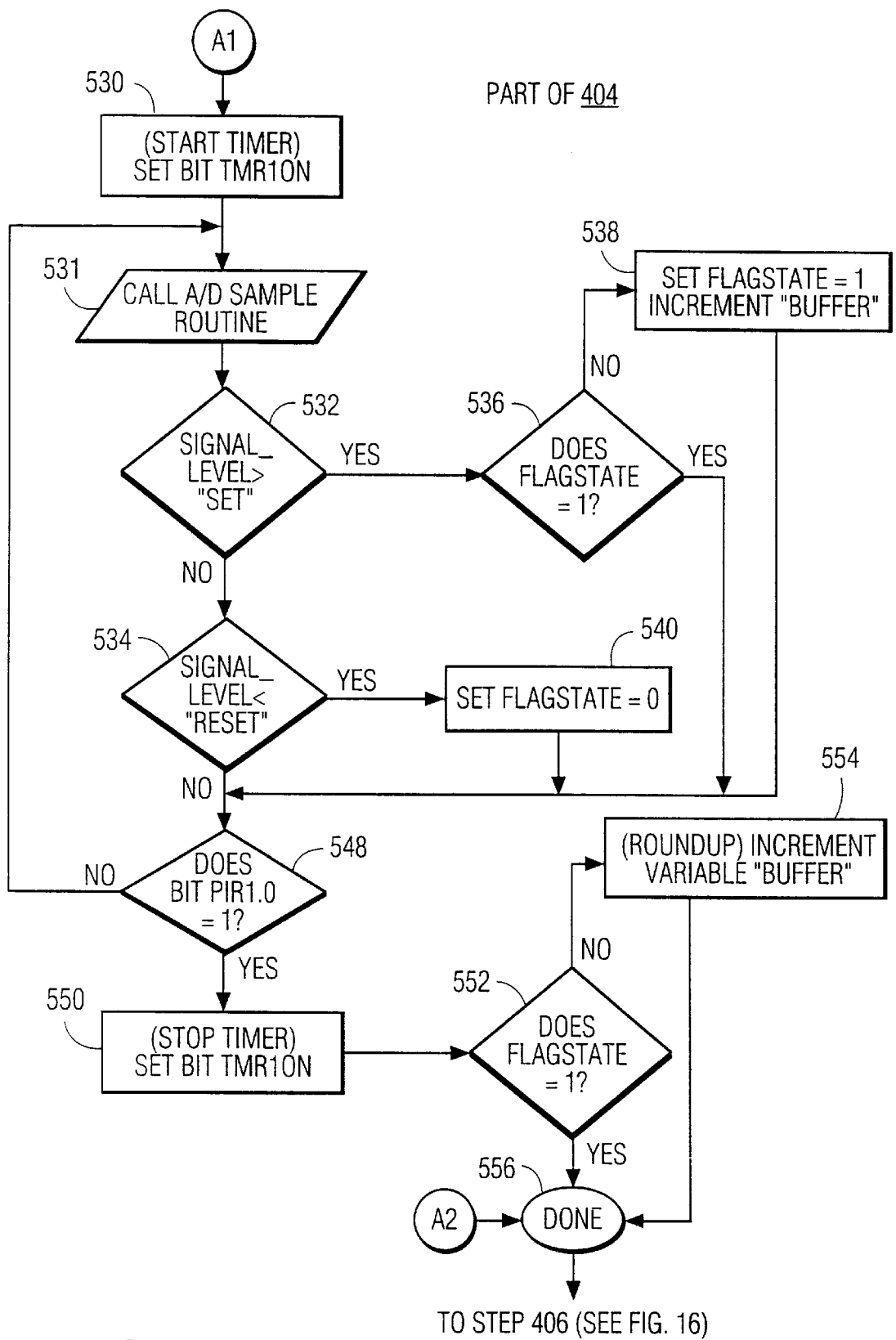

FIG. 17A and 17B show a flow diagram of the Measure Doppler Routine, wherein each step is illustrated by a designation number. The Measure Doppler Routine is called by the Measure-n-Doppler Routine 604 (see FIG. 16) to determine when a valid signal is detected and to measure its speed. The routine begins via start step 500, and proceeds to step 502 for selecting the A/D port of microcontroller 45 with the Doppler signal. In this embodiment, the Doppler signal is inputted to pin 2 of the PIC16C72 microcontroller 45. The internal hardware timer is setup via step 504, and sets the period of time used to measure the Doppler shift. Approximately 33 milliseconds is being used in the preferred embodiment because it is long enough to minimize the error incurred in determining the Doppler shift, as previously described, and is short enough to allow measuring the speed of an object over a relatively short distance. For example, an object traveling 100 mph will travel approximately five feet in 33 msec, short enough that the speed of most objects including baseballs and cars can be measured. The timer counts for 33 milliseconds before the bit PIR1.0 is set to one. PIR1.0 is the timer overflow and represents the end of the measurement for that period. After the hardware timer is setup, the counter T1-count is set to zero via step 506. This variable represents the time period the loop looks for a valid signal. The A/D sample routine is then called via step 508, and it returns the variable "SIGNAL_LEVEL". Next, in step 510 the routine then looks for a signal which is less than a predetermined threshold called "PRERESET", and then in step 520 greater than a positive predetermined threshold called "PRESET", before the actual speed measurement commences. These levels are greater than the levels needed to measure speed and help to minimize false triggering. First the routine decides whether "SIGNAL_LEVEL" is less than "PRERESET" via step 510. If it is not, the variable "T1-COUNT" is decremented, via step 512. The routine checks "T1-COUNT" via step 514, to determine whether the time looking for a valid signal has elapsed. If the time has ended, the routine "MEASURE DOPPLER" ends at step 556, and the program returns to where it was called without a valid speed to step 606 (see FIG. 16). If time has not elapsed the routine jumps back three steps to the call A/D sample routine step 508, to repeat this process. During this process, if "SIGNAL_LEVEL" is found to be less than "PRERESET" 510, "T1-COUNT" is cleared via step 516, and the routine then looks for a signal greater than "PRESET". First via step 518 the "A/D SAMPLE ROUTINE" is called (see FIG. 15). "SIGNAL_LEVEL" is checked via step 520 to determine whether it is greater than "PRESET". If it is not, "T1-COUNT" is decremented via step 522. The routine then determines via step 524 whether "T1-COUNT"=zero, i.e. if the time has elapsed. If the time has elapsed, the routine is completed in step 556, and the program jumps back to the "MEASURE-N-DOPPLER ROUTINE" step 606 (see FIG. 16). If the time has not elapsed, the program returns to step 518 at the top of this loop, and repeats the process of looking for a signal greater than "PRESET". When the routine finds a signal greater than "PRESET", the speed measurement begins at step 530.

To determine the Doppler shift, the counting routine uses a lower level trigger to give a more reliable count of weak variable amplitude signals. The measurement starts in step 530 by setting bit TMR1ON, which starts a timer. This timer defines the time period over which the Doppler signal is counted. Once the timer is started the "A/D SAMPLE ROUTINE" is called via step 531 to return "SIGNAL_LEVEL". As previously described, the A/D Sample Routine is shown in FIG. 15. From step 388 step 532 is entered. The routine then decides whether the signal is greater than a predefined threshold defined by variable "SET" via step 532. If so, in step 536 it sets the variable "FLAGSTATE"=1, signifying the signal is in the positive swing of its cycle. The variable "BUFFER" which represents the number of periods counted during the present counting cycle is incremented by one via step 538. If "SIGNAL_LEVEL" is not greater than "SET" in 532 the routine goes to step 534. If the signal is less than "RESET" in step 534, which represents the threshold the signal should cross on its negative swing, the routine then sets "FLAGSTATE" to zero via step 540, to signify that the signal is in the negative swing. The time is than checked in step 548 to make sure it is within the time period for counting cycles. If time has not expired, the routine loops back to call the "A/D SAMPLE ROUTINE" 531 again to receive the current "SIGNAL_LEVEL". The routine again decides in step 532 whether or not "SIGNAL_LEVEL" is above the positive threshold via step 532, or below the negative threshold via step 534. If above, and if the previous state was not positive as signified by "FLAGSTATE"=0 via step 536, "FLAGSTATE" is then set to one and "BUFFER" is incremented via step 538, signifying a new cycle has begun. If "FLAGSTATE" was previously set to one, the previous measurement was in the same positive cycle, and therefore "BUFFER" should not be incremented. If in step 534 the signal level falls below the negative threshold, the signal is in the negative swing and "FLAGSTATE" is set to zero in step 540. This process continues until the time elapses as determined in step 548 for this measurement cycle, which has been defined as approximately 33 milliseconds and is signaled by "PIR1.0"=1. Upon such time elapse, the timer is stopped and bit TMR1ON is cleared via step 550. "FLAGSTATE" is checked via step 552 to see if the measurement cycle concluded with the "SIGNAL_LEVEL" being in the negative half cycle, and if not, the buffer is incremented via step 554 to roundup the speed. If so, and after roundup, the Measure Doppler Routine is completed, and via step 556 the program returns to step 606 (see FIG. 16) with the variable "BUFFER" representing the number of periods counted in a given time period.

An alternate method to determine speed is to sample at a high enough rate to measure the signal's time period in a single cycle or half cycle. This offers the advantage of measuring speed very rapidly. However, it has the disadvantage of requiring higher performance parts, which are more expensive and require more power.

Although various embodiments of the invention have been shown and described herein, they are not meant to be limiting. Those of skill in the art may recognize certain modifications to the embodiments of the invention, which modifications are meant to be covered by the spirit and scope of the appended claims.

What is claimed is:

1. A portable ultracompact radar system for measuring the speed of a moving target by means of a Doppler shift, comprising:

a multilayer printed circuit board includes on a top portion a first outer electrically conductive layer onto which a transmit antenna and a receive antenna are patterned, and on a bottom portion a second outer electrically conductive layer formed into a plurality of electrically conductive paths, said second outer conductive layer being in a plane parallel to the plane of said first outer conductive layer, said first and second outer conductive layers having at least one ground plane layer disposed therebetween, each of said layers being electrically isolated from one another by an individual electrical insulation layer; and electronic circuitry mounted upon said electrically conductive paths of said second outer conditions layer, the circuitry comprising an oscillator for producing an output signal, said output signal being coupled to a first input of a coupler means for dividing said oscillator output signal into an rf output signal coupled to the transmit antenna, and a local oscillator signal coupled to a first input of a mixer means, the mixer means having a second input receptive of a target reflective signal from the receive antenna, said mixer means operating to combine said local oscillator signal and said target reflected signal to produce a Doppler signal, a microcontroller being receptive of said Doppler signal for processing the same and producing a speed signal for connection to and display by means for displaying the detected speed; and means for electrically interconnecting portions of said first and second outer layers and said at least one ground plane layer together.

2. The radar system of claim 1, wherein the circuit board consists of a four layer circuit board including a centrally located electrically non-conductive core, first and second electrically conductive ground plane layers having inner surfaces bonded to each side of the center core, respectively, first and second electrically nonconductive substrates affixed to an outer surface of said first and second ground plane layers, respectively, said first outer conductive layer being affixed to an outer surface of said first substrate, and said second outer conductive layer being affixed to an outer surface of said second nonconductive substrate.

3. The radar system of claim 2, wherein said electrical interconnection means includes plated through vias through said core and said first and second substrates for selectively connecting portions of said first and second outer electrically conductive layers, whereby said vias are electrically isolated from the ground planes.

4. The radar system of claim 1, further including:

a first amplifier having an input and an output, a low pass filter having an input and an output, a second amplifier having an input and an output, and a dc block and level shift circuit having an input and an output, are connected in series between an output terminal of said mixer and an input terminal of said microcontroller.

5. The radar system of claim 1, wherein said electronic circuitry further includes:

a source of dc voltage;

memory means included in said microcontroller for storing a predetermined number of successively detected moving target speeds;

mode means for both selectively applying said source of dc voltage to power up said electronic circuitry, and for selectively applying one of first, second, and third different levels of dc voltage, derived from said source of dc voltage, to said microcontroller; and said microcontroller being programmed to respond to said first level of dc voltage for placing said level of dc voltage for placing said radar system in a trigger mode of operation for displaying the fastest speed detected after a first predetermined time period from the receipt of said first level of dc voltage;

said microcontroller being programmed to respond to said second level of dc voltage for placing said radar system in a continuous mode of operation, for displaying the fastest speed detected a second predetermined time period from the receipt of said second level of dc voltage; and said microcontroller being programmed to respond to said third level of dc voltage for placing said radar system in a memory recall mode of operation, for accessing said memory means to successively display the detected moving target speeds stored in said memory means.

6. The radar system of claim 2, wherein said oscillator means includes a boron nitride support secured on one side to a portion of said second substrate, a dielectric resonator secured to another side of said boron nitride support, and a metal housing secured to said second substrate for enclosing said dielectric resonator and said boron nitride support, said metal housing being electrically connected to a grounded one of said plurality of electrically conductive paths.

7. The radar system of claim 1, wherein the circuit board includes a microwave amplifier electrically connected between the receive antenna and the second input of said microwave mixer means.

8. The radar system of claim 1, wherein the microwave mixer includes a branchline coupler receptive of said target reflected signal and said local oscillator signal, respectively.

9. The radar system of claim 4, wherein the combination of said first amplifier, low pass filter, and second amplifier has a bandwidth ranging from 0 Hz to 5 kHz.

10. The radar system of claim 9, wherein an output signal from said second amplifier is said Doppler signal having positive and negative half cycles, and said microcontroller includes an analog-to-digital converter programmed to convert the Doppler signal into a digital signal.

11. The radar system of claim 10, wherein said microcontroller is programmed to calculate the speed of the moving target from said Doppler signal.

12. The radar system of claim 1, wherein the liquid crystal display provides an indication of the speed of the moving target.

13. The radar system of claim 12, wherein the microcontroller is programmed to calculate the speed of the moving target from the Doppler signal by performing multiple measurements with the highest calculated speed measured in a predetermined period of time being selected as the speed measurement to display.

14. The radar system of claim 13, wherein a 0.2 second delay is said predetermined period of time in a trigger mode of operation for calculating the Doppler speed for allowing mechanical settling of vibration in said system.

15. The radar system of claim 1, wherein said microcontroller includes a reduced instruction set computer (RISC) operating at an intermediate frequency of 4 MHz.

16. The radar system of claim 14, wherein the microcontroller is programmed such that Doppler speed measurement does not initiate unless the Doppler signal strength is above a pretrigger level sufficient to permit counting, but once initiated, a lower signal level trigger is used to give a more reliable count of weak, variable amplitude Doppler signals.

17. The radar system of claim 10, wherein the LCD display is coupled directly to said microcontroller first output, and the microcontroller analog-to-digital converter is programmed to measure Doppler signals having amplitudes greater than 100 millivolts.

18. The radar system of claim 1, wherein a single antenna is used for both transmitting and receiving signals.

19. The radar system of claim 1, further including an enclosure consisting of electrically non-conductive material.

20. The radar system of claim 19, which said enclosure includes tripod mounting means.

21. A self-contained portable ultracompact radar system for measuring the speed of a moving target, comprising:
  a multilayer printed circuit board including:
    a center core of electrically insulative material;
    first and second electrically conductive ground plane layers having inner surfaces secured to top and bottom sides of said center core, respectively;
    first and second electrically insulative substrates having innermost sides secured to an outer surface of said first and second ground plane layers, respectively, said first and second electrically insulative substrates also having outermost sides parallel to and opposing there innermost sides, respectively;
    transmit and receive antenna patterns formed from a layer of electrically conductive material secured to the outermost side of said first electrically insulative substrate;
    electrically conductive paths formed from a layer of electrically conductive material secured to the outermost side of said second electrically insulative substrate;
    means for selectively electrically interconnecting portions of said transmit and receive antenna patterns to portions of said electrically conductive paths;
  electronic means mounted upon the outermost side of said second electrically insulative substrate, and electrically connected to preselected portions of said electrically conductive paths, for selectively applying an rf signal to said transmit antenna for transmitting into the path of a moving target, for thereafter receiving a target reflected signal from said receive antenna, said electronic means further including mean for processing a portion of said rf signal and said target reflected signal, for producing a speed signal for application to a display, for displaying the speed of said moving target on a display.

22. The radar system of claim 21, further including a plastic housing for enclosing and protecting said multilayer printed circuit board and said electronic means, said housing being configured for providing a handheld housing.

23. A portable hand held radar system for measuring the speed of a moving target, comprising:
  at least a two layer printed circuit board;
  a transmit antenna and a receiver antenna patterns of electrically conductive material formed on said board;
  a pattern of electrically conductive circuit paths formed on said board, with portions electrically connected to said transmit and receive antenna patterns, respectively;
  transmitter circuit means mounted on said board, and electrically connected to portions of said circuit paths for transmitting a radar signed from said transmit antenna into the path of a moving target; and
  receiver circuit means mounted on said board, and electrically connected to portions of said circuit paths for receiving from said receive antenna a reflected radar signal from said moving target, said receiver circuit means further including means for computing the Doppler shift between said transmitted radar signal and said reflected radar signal for displaying the speed of said moving target.

* * * * *